US006912390B2

(12) United States Patent
Andersson et al.

(10) Patent No.: US 6,912,390 B2
(45) Date of Patent: Jun. 28, 2005

(54) CONNECTION HANDLING IN SRNC RELOCATION

(75) Inventors: Staffan Andersson, Enskede (SE); Mikael Agnevik, Nacka (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 635 days.

(21) Appl. No.: 09/829,001

(22) Filed: Apr. 10, 2001

(65) Prior Publication Data

US 2002/0082014 A1 Jun. 27, 2002

Related U.S. Application Data

(60) Provisional application No. 60/257,116, filed on Dec. 22, 2000.

(51) Int. Cl.[7] .................................................. H04Q 7/20
(52) U.S. Cl. ........................ 455/436; 455/436; 455/438; 455/439; 370/331; 370/338
(58) Field of Search ................................. 455/436, 438, 455/439, 442, 445; 370/331, 338, 310.1, 310.2

(56) References Cited

U.S. PATENT DOCUMENTS

| | | |
|---|---|---|
| 4,692,917 A | 9/1987 | Fujioka |
| 4,973,956 A | 11/1990 | Lin et al. |

(Continued)

FOREIGN PATENT DOCUMENTS

| | | |
|---|---|---|
| EP | 0 405 042 A1 | 1/1991 |
| EP | 0 800 324 A2 | 10/1997 |

(Continued)

OTHER PUBLICATIONS

US 5,361,257, 11/1994, Petersen (withdrawn)

(Continued)

*Primary Examiner*—Sonny Trinh
*Assistant Examiner*—Un C Cho
(74) *Attorney, Agent, or Firm*—Nixon & Vanderhye, P.C.

(57) ABSTRACT

In a radio access network of a telecommunications system, an end-to-end signaling protocol is utilized to establish plural distinct connection or link segments comprising a radio connection involving a user equipment unit (30). The plural distinct connection segments extend in series between a device ($27_1$) in a first radio network control node (SRNC $26_1$) and a device at a base station ($28_{2-1}$) controlled by a second radio network control node (DRNC $26_2$). An example end-to-end signaling protocol is AAL2. Provision of the plural distinct connection segments is advantageous when performing a SRNC relocation procedure to make the second radio network control node serve as the SRNC for the radio connection involving the user equipment unit. After performance of the SRNC relocation procedure, a retained one of the plural distinct connection segments ($400_1$, $500_1$) can still be utilized, e.g., a segment extending between the device at the base station controlled by the second radio network control node and a device at the second radio network control node. The retained one of the connection segments can either be utilized in series with a post-relocation connection segment to establish a path between the base station controlled by the second radio network control node and a diversity handover unit at the second radio network control node, or have its connection point moved to the diversity handover unit at the second radio network control node. Disclosed modes include a three connection segment mode and a two connection segment mode. In one of its aspects, the present invention utilizes binding information to accommodate employment of the multiple connection segments such as described in the three connection segment mode and the two connection segment mode.

48 Claims, 16 Drawing Sheets

U.S. PATENT DOCUMENTS

| | | |
|---|---|---|
| 5,038,343 A | 8/1991 | Lebizay et al. |
| 5,079,762 A | 1/1992 | Tanabe |
| 5,126,999 A | 6/1992 | Munter et al. |
| 5,128,931 A | 7/1992 | Yamanaka et al. |
| 5,140,582 A | 8/1992 | Tsuboi et al. |
| 5,144,293 A | 9/1992 | Rouse |
| 5,150,358 A | 9/1992 | Punj et al. |
| 5,467,347 A | 11/1995 | Petersen |
| 5,491,693 A | 2/1996 | Britton et al. |
| 5,499,239 A | 3/1996 | Munter |
| 5,568,479 A | 10/1996 | Watanabe et al. |
| 5,570,362 A | 10/1996 | Nishimura |
| 5,623,493 A | 4/1997 | Kagemoto |
| 5,680,390 A | 10/1997 | Robrock, II |
| 5,710,882 A | 1/1998 | Svennevik et al. |
| 5,724,348 A | 3/1998 | Basso et al. |
| 5,740,156 A | 4/1998 | Tanabe et al. |
| 5,790,541 A | 8/1998 | Patrick et al. |
| 5,809,129 A | 9/1998 | Andersson et al. |
| 5,946,309 A | 8/1999 | Westberg et al. |
| 5,963,553 A | 10/1999 | Wicklund |
| 5,963,564 A | 10/1999 | Petersen et al. |
| 5,987,515 A | 11/1999 | Ratcliff et al. |
| 6,009,103 A | 12/1999 | Woundy |
| 6,034,958 A | 3/2000 | Wicklund |
| 6,088,359 A | 7/2000 | Wicklund et al. |
| 6,128,295 A | 10/2000 | Larsson et al. |
| 6,154,459 A | 11/2000 | Wicklund |

FOREIGN PATENT DOCUMENTS

| | | |
|---|---|---|
| EP | 0 827 305 A1 | 3/1998 |
| WO | 93/19559 | 9/1993 |
| WO | 95/30318 | 11/1995 |
| WO | 96/34478 | 10/1996 |
| WO | 97/41696 | 11/1997 |
| WO | 97/33406 | 12/1997 |
| WO | 99/51051 A2 | 10/1999 |
| WO | 00/11899 A2 | 3/2000 |
| WO | 00/44191 A1 | 7/2000 |

OTHER PUBLICATIONS

"ATM User–network Interface (UNI) Signaling Specification", Version 4.0, af–sig–0061.00, Jul. 1996, generated by the ATM Forum Technical Committee.

ATM Adaptation Layer Switching, Mauger et al, XVI World Telecom Congress Proceedings (XP–000720525) (pp. 207–214).

U.S. Appl. No. 09/188,101, filed Nov. 9, 1998, "Asynchronous Transfer Mode".

U.S. Appl. No. 09/188,102, filed Nov. 9, 1998, Asynchronous Transfer Mode System Handling Differing AAL Protocol.

U.S. Appl. No. 09/249,785, filed Feb. 19, 1999, entitled "Establishing Internal Control Paths in ATM Node".

Mauger et al, "QoS Guarantees for Multimedia Services on a TDMA–Based Satellite Network", IEEE Communications Magazine, Jul. 1997, pp. 60–65.

Doi et al, "A High–Speed ATM Switch Architecture for FTTH—An ATM Switch Architecture with Input and Cross–Point Buffers", ISS '95, World Telecommunications Congress (International Switching Symposium), Advanced Switching Technologies for Universal Telecommunications at the Beginning of the $21^{st}$ Century, Berlin, Apr. 23–28, 1995, vol. 1, No. SYMP 15, Apr. 23, 1995, pp. 384–388.

Weller et al., "Scheduling Nonuniform Traffic in a Packet Switching System with Small Propagation Delay", Proceedings of the Conference on Computer Communications, (INFOCOM), Toronto, Jun. 12–16, 1994, vol. 3, Jun. 12, 1994, pp. 1344–1351.

Eneroth et al, "ATM Transport in Cellular Networks", Iss '97, World Telecommunications Congress (International Switching Symposium), Global Network Evolution: Convergence or Collision? Toronto, Sep. 21–26, 1997, vol. 2, Sep. 21, 1997, pp. 139–146.

Saito et al, "Layered Cell Structure for ATM Networks", 1996 IEEE International Conference on Communications (ICC), Converging Technologies for Tomorrow's Applications, Dallas, Jun. 23–27, 1996, vol. 3, Jun. 23, 1996, pp. 1254–1257.

McTiffin et al, "Mobile Access to an ATM Network Using a CDMA Air Interface", IEEE Journal on Selected Areas in Communications, vol. 12, No. 5, Jun. 1, 1994, pp. 900–908.

Baldwin et al, "AAL–2—A new ATM Adaptation Layer for Small Packet Encapsulation and Multiplexing", Bell Labs Technical Journal, vol. 2, No. 2, Mar. 21, 1997, pp. 111–131.

Stephens et al, "Large–Scale ATM Switching Systems for B–ISDN", IEEE Journal, vol. 9, No. 8, Oct. 1991, pp. 1157–1160.

Chao, "A Recursive Modular Terabit/Second ATM Switch", IEEE Journal, vol. 9, No. 8, Oct. 1991, pp. 1161–1172.

Tobagi et al, "Architecture, Performance, and Implementation of the Tandem Banyan Fast Packet Switch" IEEE Journal, vol. 9, No. 8, Oct. 1991, pp. 1173–1193.

Urushidani, "Rerouting Network: A High–Performance Self–Routing Switch for B–ISDN", IEEE Journal, vol. 9, No. 8, Oct. 1991, pp. 1194–1204.

Yang et al., "A Reconfigurable ATM Switch Fabric for Fault Tolerance and Traffic Balancing", IEEE Journal, vol. 9, No. 8, Oct. 1991, pp. 1205–1217.

Itoh, "A Fault–Tolerant Switching Network for B–IDSN", IEEE Journal, vol. 9, No. 8, Oct. 1991, pp. 1218–1226.

Banwell et al., "Physical Design Issues for Very Large ATM Switching Systems", IEEE Journal, vol. 9, No. 8, Oct. 1991, pp. 1227–1238.

Kozaki et al, "32×32 Shared Buffer Type ATM Switch VLSI's for B–ISDN's", IEEE Journal, vol. 9, No. 8, Oct. 1991, pp. 1239–1247.

Shobatake et al, "A One–Chip Scalable 8 * 8 ATM Switch LSI Employing Shared Buffer Architecture", IEEE Journal, vol. 9, No. 8, Oct. 1991, pp. 1248–1254.

Banniza et al, "Design and Technology Aspects of VSLI's for ATM Switches", IEEE Journal, vol. 9, No. 8, Oct. 1991, pp. 1255–1264.

Katevenis et al, "Weighted Round–Robin Cell Multiplexing in a General–Purpose ATM Switch Chip", IEEE Journal, vol. 9, No. 8, Oct. 1991, pp. 1265–1279.

Giacopelli et al, "Sunshine: A High–Performance Self–Routing Broadband Packet Switch Architecture", IEEE Journal, vol. 9, No. 8, Oct. 1991, pp. 1289–1298.

Fischer et al, "A Scalable ATM Switching System Architecture", IEEE Journal, vol. 9, No. 8, Oct. 1991, pp. 1299–1307.

Matsunaga et al, "A 1.5 Gb/s 8×8 Cross–Connect Switch Using a Time Reservation Algorithm" IEEE Journal, vol. 9, No. 8, Oct. 1991, pp. 1308–1317.

Schroeder et al, "Autonet: A High–Speed, Self–Configuring Local Area Network Using Point–to–Point Links", IEEE Journal, vol. 9, No. 8, Oct. 1991, pp. 1318–1335.

Stavrakakis, "Efficient Modeling of Merging and Splitting Processes in Large Networking Structures", IEEE Journal, vol. 9, No. 8, Oct. 1991, pp. 1336–1347.

Cisneros et al, "A Large ATM Switch Based on Memory Switches and Optical Star Couplers", IEEE Journal, vol. 9, No. 8, Oct. 1991, pp. 1348–1360.

Itoh et al, "Practical Implementation and Packaging Technologies for a Large–Scale ATM Switching Systems", IEEE Journal, vol. 9, No. 8, Oct. 1991, pp. 1280–1288.

Eneroth et al, "Applying ATM/AAL2 as a Switching Technology in Third–Generation Mobile Access Network", IEEE Communications Magazine, Jun. 1999, pp. 112–122.

Marchent et al, "Handover and Macro Diversity for $3^{rd}$ Generation Mobile Systems within ATM Fixed Networks", 1997 IEEE $47^{th}$ Vehicular Technology Coference, Phoenix, May 4–7, 1997, IEEE Vehicular Technology Conference, New York, IEEE, US, vol. 3 CONF. 47, Nov. 18, 1996, pp. 1151–1155.

International Preliminary Examination Report mailed Mar. 4, 2003 in corresponding PCT application PCT/SE01/02914.

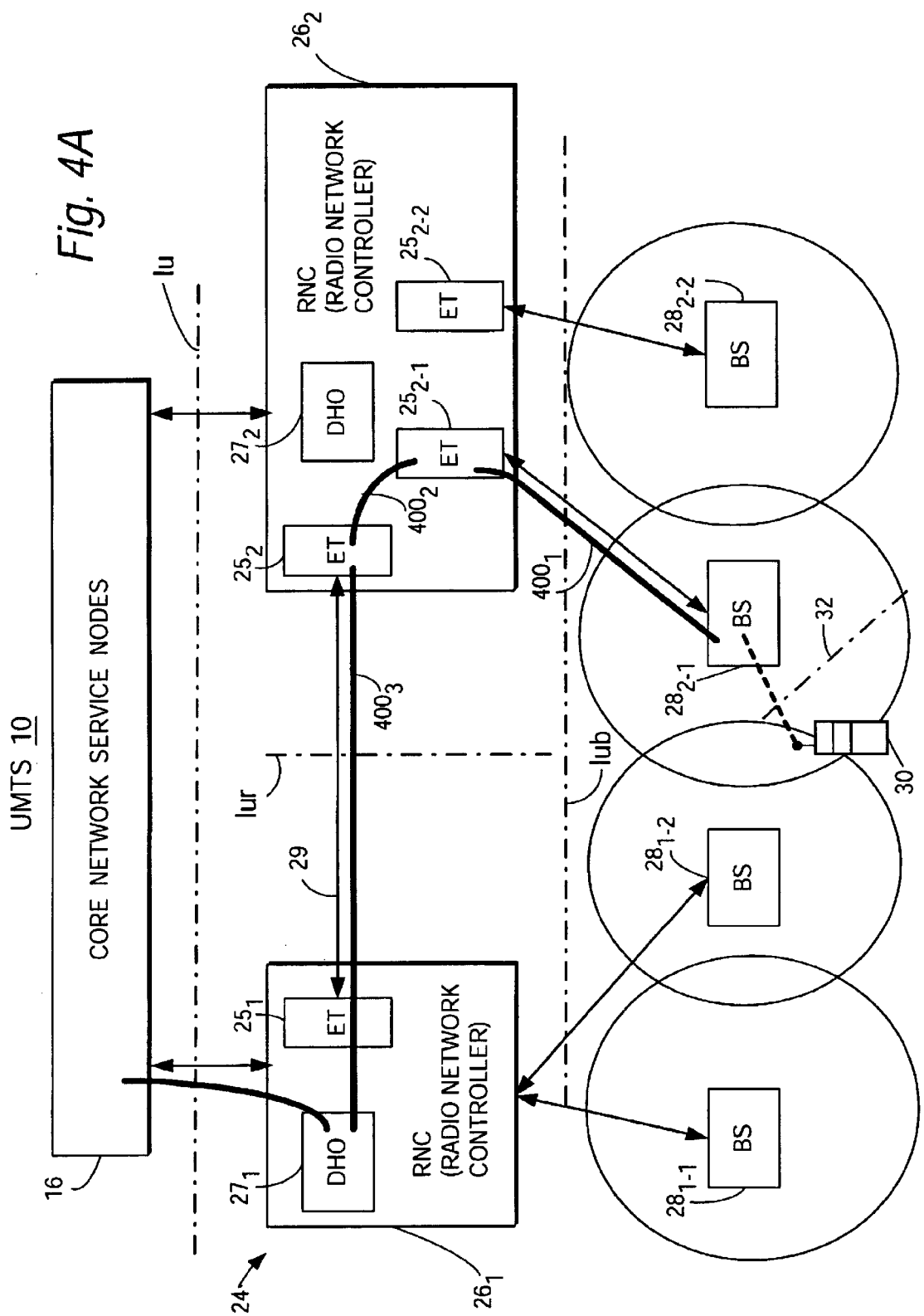

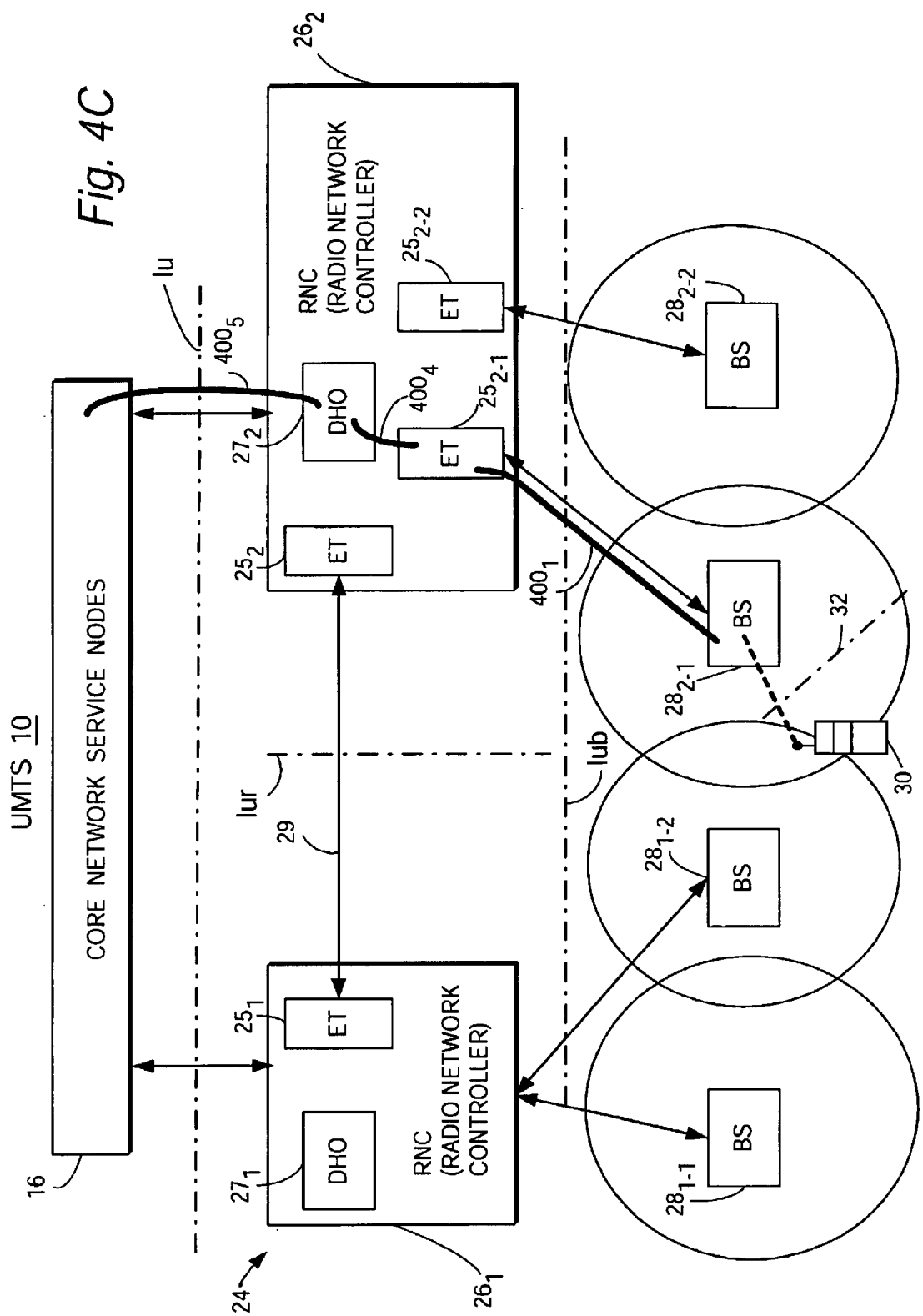

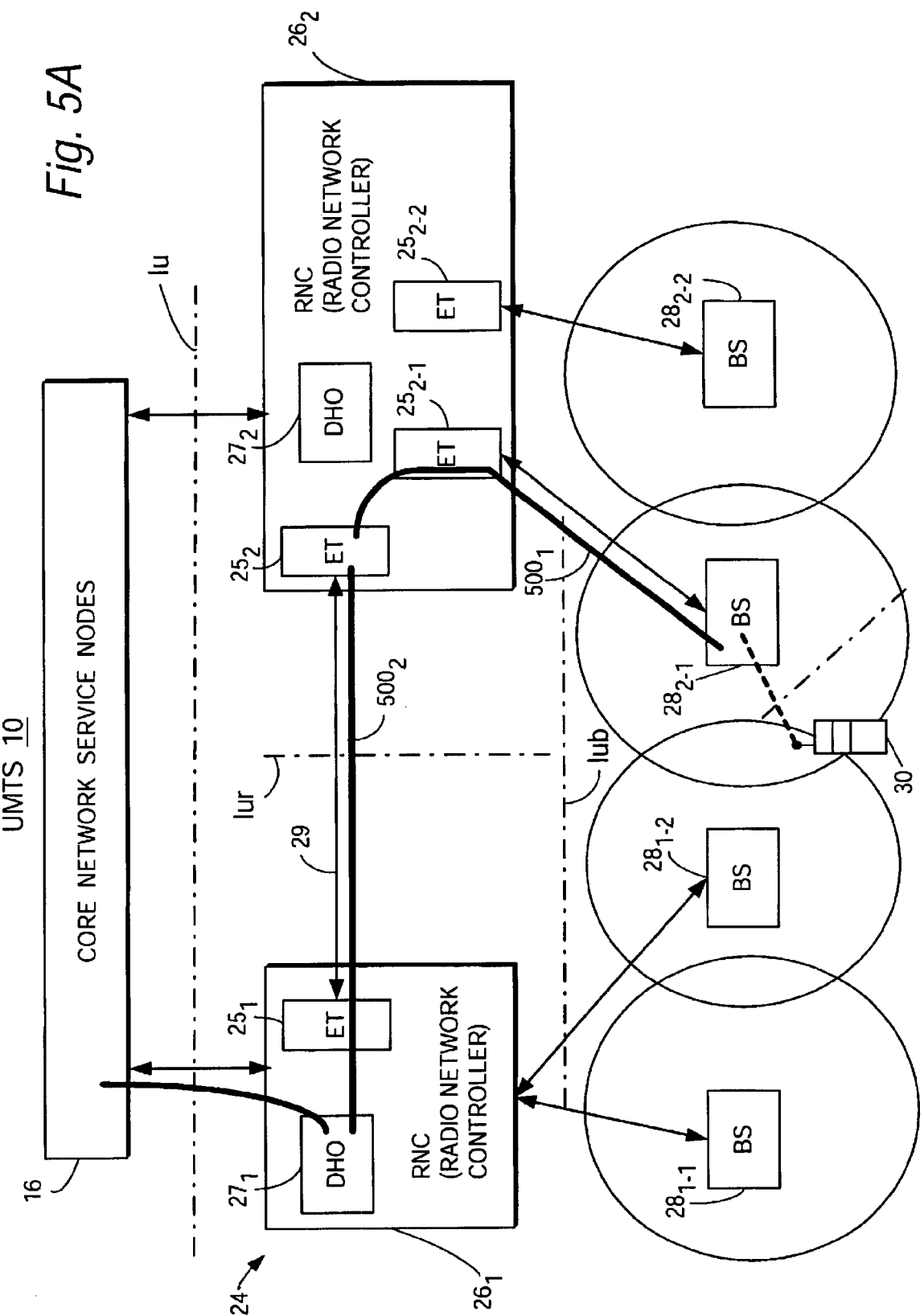

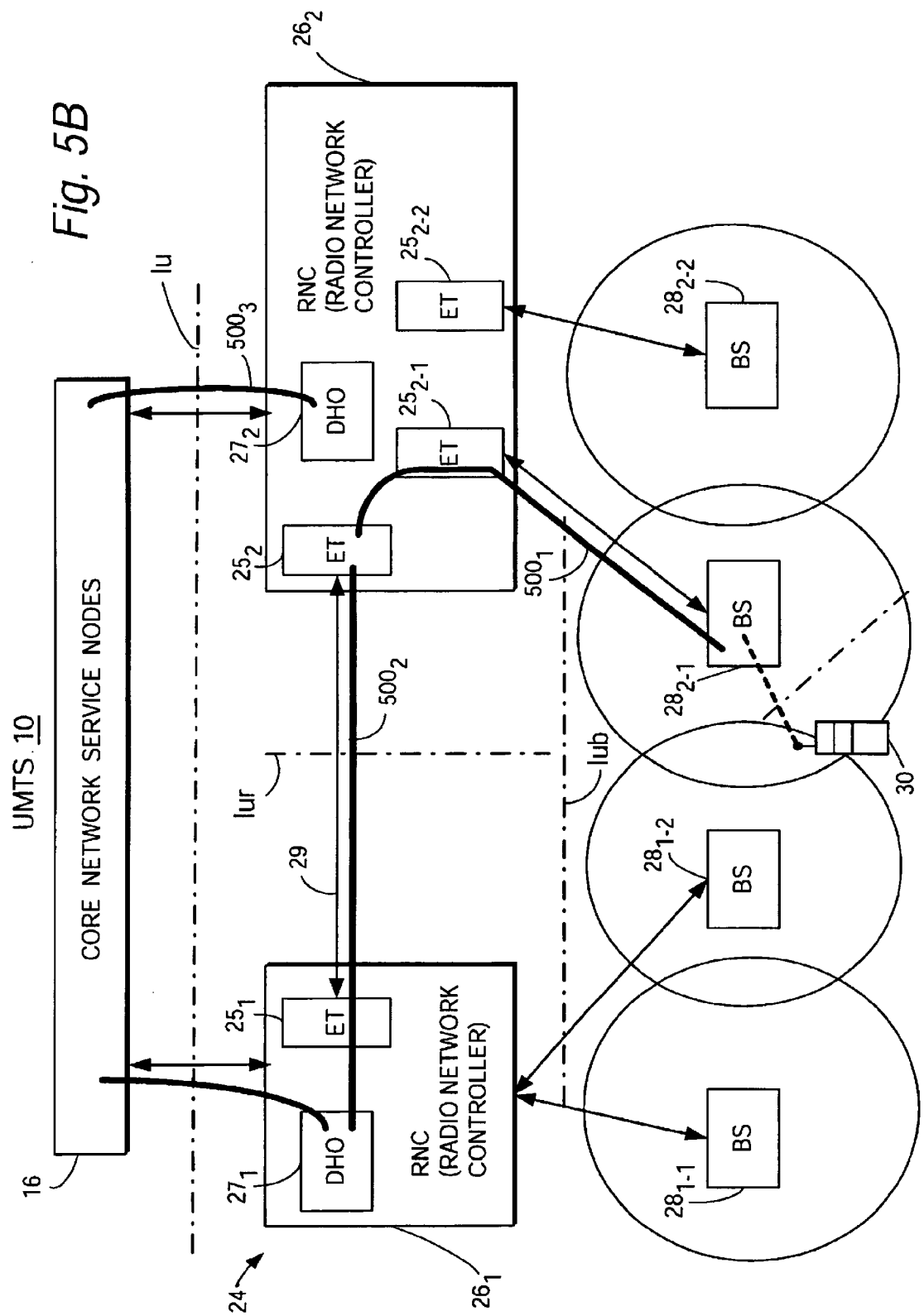

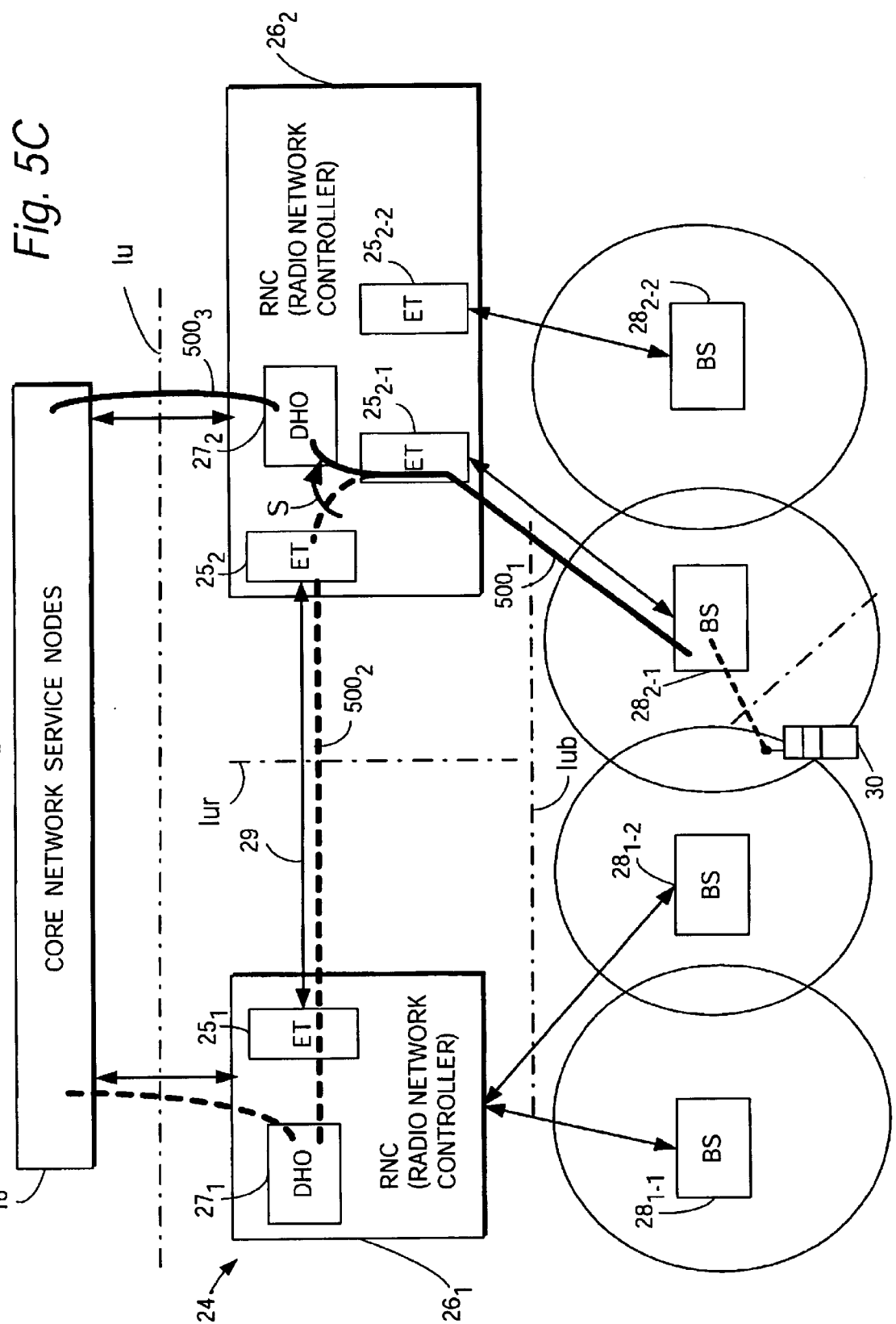

CONNECTION HANDLING IN SRNC RELOCATION

This application is related to simultaneously-filed and commonly assigned U.S. patent application Ser. No. 09/829,451, entitled "Binding Information For Telecommunications Network", which is incorporated herein by reference in its entirety. This application also claims the benefit and priority of commonly assigned U.S. Provisional Patent Application Ser. No. 60/257,216, filed Dec. 22, 2000, entitled "Binding Information For Telecommunications Network", which is incorporated herein by reference in its entirety.

BACKGROUND

1. Field of the Invention

The present invention pertains to wireless telecommunications, and particularly to moveover or relocation of a serving radio network control node in a radio access network.

2. Related Art and other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified, typically by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which is in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed code, such as a pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. The high speed PN modulation also allows the receiving station to advantageously generate a received signal from a single transmitting station by combining several distinct propagation paths of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

The Universal Mobile Telecommunications (UMTS) Terrestrial Radio Access Network (UTRAN) accommodates both circuit switched and packet switched connections. In this regard, in UTRAN the circuit switched connections involve a radio network controller (RNC) communicating with a mobile switching center (MSC), which in turn is connected to a connection-oriented, external core network, which may be (for example) the Public Switched Telephone Network (PSTN) and/or the Integrated Services Digital Network (ISDN). On the other hand, in UTRAN the packet switched connections involve the radio network controller communicating with a Serving GPRS Support Node (SGSN) which in turn is connected through a backbone network and a Gateway GPRS support node (GGSN) to packet-switched networks (e.g., the Internet, X.25 external networks).

For the UMTS R99 standard as specified by the Third Generation Partnership Project (3GPP), AAL2/ATM was selected as the user data transport in the wideband CDMA (WCDMB) radio access network (e.g., the UTRAN). Asynchronous Transfer Mode (ATM) technology (ATM) is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

A protocol reference model has been developed for illustrating layering of ATM. The protocol reference model layers include (from lower to higher layers) a physical layer (including both a physical medium sublayer and a transmission convergence sublayer), an ATM layer, and an ATM adaptation layer (AAL), and higher layers. The basic purpose of the AAL layer is to isolate the higher layers from specific characteristics of the ATM layer by mapping the higher-layer protocol data units (PDU) into the information field of the ATM cell and vise versa.

There are several differing AAL types or categories, including AAL0, AAL1, AAL2, AAL3/4, and AAL5. AAL2 is a standard defined by ITU recommendation 1.363.2. An AAL2 packet comprises a three octet packet header, as well as a packet payload. The AAL2 packet header includes an eight bit channel identifier (CID), a six bit length indicator (LI), a five bit User-to-User indicator (UUI), and five bits of header error control (HEC). The AAL2 packet payload, which carries user data, can vary from one to forty-five octets. Several AAL2 packets can be multiplexed on an ATM virtual channel (ATM VC).

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a radio connection involves both a Serving or Source RNC (SRNC) and a target or drift RNC (DRNC), with the SRNC controlling the radio connection but with one or more radio links of the radio connection being handling by the DRNC. An Inter-RNC transport link can be utilized for the transport of control and data signals between Source RNC and a Drift or Target RNC, and can be either a direct link or a logical link as described, for example, in International Application Number PCT/US94/12419 (International Publication Number WO 95/15665). An interface between radio network controllers (e.g., between a Serving RNC [SRNC] and a Drift RNC [DRNC]) is termed the "Iur" interface.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the radio connection with the user equipment unit (UE), e.g., it has full control of the radio connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for the radio connection with the user equipment unit (UE). A system which includes the drift radio network controller (DRNC) and the base stations controlled over the Iub Interface by the drift radio network controller (DRNC) is herein referenced as a DRNC subsystem or DRNS.

When a radio connection between the radio access network (RAN) and user equipment unit (UE) is being established, the radio access network (RAN) decides which RNC is to be the serving RNC (SRNC) and, if needed, which RNC is to be a drift RNC (DRNC). Normally, the RNC that controls the cell where the user equipment unit (UE) is located when the radio connection is first established is initially selected as the serving RNC (SRNC). As the user equipment unit (UE) moves, the radio connection is maintained even though the user equipment unit (UE) may move into a new cell, possibly even a new cell controlled by another RNC. That other RNC becomes a drift RNCs (DRNC) for RAN-UE connection. An RNC is said to be the Controlling RNC (CRNC) for the base stations connected to it by an Iub interface. This CRNC role is not UE specific. The CRNC is, among other things, responsible for handling radio resource management for the cells in the base stations connected to it by the Iub interface.

In certain situations it its advantageous to transfer control of a particular UE connection from one RNC to another RNC. Such a transfer of control of the UE connection from one RNC to another RNC has been referred to as soft RNC handover, SRNC moveover, and SRNC relocation. A relocate function/procedure is provided to effect this transfer of control. This is a general function/procedure covering UMTS internal relocations (e.g., relocation of SNRC within the UMTS) as well as relocations to other systems (e.g., from UMTS to GSM, for example). SRNC relocation is described in various references, including the following example commonly assigned patent applications (all of which are incorporated herein by reference):

(1) U.S. patent application Ser. No. 09/035,821 filed Mar. 6, 1998, entitled "Telecommunications Inter-Exchange Measurement Transfer";

(2) U.S. patent application Ser. No. 09/035,788 filed Mar. 6, 1998, entitled "Telecommunications Inter-Exchange Congestion Control";

(3) U.S. patent application Ser. No. 08/979,866 filed Nov. 26, 1997, entitled "Multistage Diversity Handling For CDMA Mobile Telecommunications";

(4) U.S. patent application Ser. No. 08/980,013 filed Nov. 26, 1997, entitled "Diversity Handling Moveover For CDMA Mobile Telecommunications";

(5) U.S. patent application Ser. No. 09/732,877 filed Dec. 11, 2000, entitled "Control Node Handover In Radio Access Network";

(6) U.S. patent application Ser. No. 09/543,536 filed Apr. 5, 2000, entitled "Relocation of Serving Radio Network Controller With Signaling of Linking of Dedicated Transport Channels".

SRNC relocation is intended to make more efficient use of the transmission network. Once the former SRNC is not needed, the connection to the core network is moved and the connection between the two RNCs (the former SRNC and the former DRNC over the Inter-RNC link) is disconnected.

An important function in the new CDMA networks is the soft handover function (briefly described above). Implementation of soft handover is facilitated by a diversity handling (DHO) unit or device. The DHO is situated at the SRNC handling the connection to a certain user equipment unit (UE). In the uplink from the user equipment unit (UE), the DHO combines the user data from two or more legs from different base stations, choosing the best data for forwarding on to the other party involved in the connection. In the downlink, the DHO splits the data into two or more legs for transmission to the different base stations. A DHO is always involved in a connection which has soft handover capability.

As mentioned above, a DHO is allocated in the SRNC. FIG. 1 shows such a SRNC $326_1$ connected to a core network and controlling radio base stations RBS $328_{1\text{-}1}$ through RBS $328_{2\text{-}1}$. The SRNC $326_1$ has a DHO $327_1$, as well as an extension terminal ET $325_1$ through which SRNC $326_1$ interfaces with Inter-RNC link 329. FIG. 1 further shows a DRNC $326_2$, having an extension terminal ET $325_{2\text{-}1}$ for interfacing with the Inter-RNC link, and controlling radio base stations RES $328_{2\text{-}1}$ through RBS $328_{2\text{-}2}$. FIG. 1 shows a situation having a call involving user equipment unit (UE) 330 routed over DRNC $326_2$, with a DHO $327_2$, also being allocated at the DRNC $326_2$ just in case SRNC relocation should occur (e.g., pending SRNC relocation). But this allocation of an extra DHO exacts network resources, and can introduce an undesired delay.

Rather than a situation involving two allocated DHOs such as that shown in FIG. 1, it is more preferable that only one DHO be allocated at a time for a given connection, with that one DHO being at the SRNC. To cater to this preference, it is conceivable to wait to allocate a new DHO $327_2$ at a new SRNC $326_2$ until the SRNC relocation actually occurs as shown in FIG. 2, and to set up a new connection from the DHO to the RBS after disconnecting the old connection. The connections are then always setup end-to-end by means of AAL2 signaling. However, the applicable standards require that the connection to the RBS from the DRNC always be kept.

What is needed, therefore, and an object of the present invention, is a SRNC relcoation technique which involves allocation of only one diversity handling unit (DHO) at a time, but which does not change the connection from the new SRNC to the radio base station (RBS).

BRIEF SUMMARY OF THE INVENTION

In a radio access network of a telecommunications system, an end-to-end signaling protocol is utilized to establish at least a node-transcendent one of plural distinct connection or link segments comprising a radio connection involving a user equipment unit. The plural distinct connection segments extend in series between a device in a first radio network control node and a device in a base station controlled by a second radio network control node. The first radio network control node serves as a serving radio network control (SRNC) node and the second radio network control serves as a drift radio network control (DRNC) node for the radio connection with the user equipment unit. An example end-to-end signaling protocol is AAL2.

Provision of the plural distinct connection segments is advantageous when performing a SRNC relocation procedure to make the second radio network control node serve as the SRNC for the radio connection involving the user equipment unit. For example, after performance of the SRNC relocation procedure, a retained one of the plural distinct connection segments can still be utilized, e.g., a segment extending between the base station controlled by the second radio network control node and a device at the second radio network control node. The retained one of the connection segments can either be utilized in series with a post-relocation connection segment to establish a path between the device at the base station controlled by the second radio network control node and a diversity handover unit at the second radio network control node, or have its connection point moved to the diversity handover unit at the second radio network control node.

Disclosed modes include a three connection segment mode and a two connection segment mode. In the three connection segment mode, a first of the plural distinct connection segments is established between a first connection point at the second radio network control node and the base station controlled by the second radio network control node. Another (second) of the plural distinct connection segments is established between the first connection point at the second radio network control node and a second connection point at the second radio network control node. Yet another (third) of the plural distinct connection segments is established between the second connection point at the second radio network control node and the device at the first radio network control node. The first connection point and the second connection point at the second radio network control node can be, for example, a first connection point and a second connection point (e.g., in/at a first extension terminal and a second extension terminal, respectively). The first connection segment extends through a switch at the second radio network control node In the three connection segment mode, upon performing a SRNC relocation procedure to make the second radio network control node serve as the SRNC for the radio connection involving the user equipment unit; the first connection segment can be retained to comprise the radio connection with the user equipment unit. Moreover, subsequent to performance of the SRNC relocation procedure, the first connection segment can be utilized in series with a post-relocation connection segment to establish a path between the base station controlled by the second radio network control node and a diversity handover unit at the second radio network control node.

In the two connection segment mode, a first (retainable) of the plural distinct connection segments is established between a connection point at the second radio network control node and the base station controlled by the second radio network control node. Another (second) of the plural distinct connection segments is established between the connection point at the second radio network control node and the device at the first radio network control node. The connection point at the second radio network control node can be a connection point (e.g., extension terminal) situated between a switch of the second radio network control node and a link to the first radio network control node.

In the two connection segment mode, upon performing a SRNC relocation procedure to make the second radio network control node serve as the SRNC for the radio connection involving the user equipment unit; an endpoint of the first (retainable) one of the plural distinct connection segments can be moved to a diversity handover unit at the second radio network control node, thereby still keeping the first connection segment after the SRNC relocation.

In one of its aspects, the present invention utilizes binding information to accommodate employment of the multiple connection segments such as described in the three connection segment mode and the two connection segment mode. In this regard, the node-transcending one of the plural distinct connection segments has a connection point at a given node, the given node being one of the first radio network control node, the second radio network control node, and the base station. The given node has a call control process in a call layer which is separated from a connection control process in a connection layer. In accordance with this aspect of the invention, the call layer control process obtains a binding reference to represent the connection point. In one implementation of this aspect, the binding reference (such as, for example, a Served User Generated Reference [SUGR]) is in a predetermined range which is reserved for setting up AAL2 connections (e.g., connection segments) to connection points. In another implementation, the binding reference is associated in a table with a predetermined value which denotes a connection point value. The binding reference can be obtained either from the connection layer or from the call layer.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4A–FIG. 4C are schematic views illustrating example stages of a first example mode of establishing radio connections and performing SRNC relocation according to the present invention.

FIG. 5A–FIG. 5D are schematic views illustrating example stages of a second example mode of establishing radio connections and performing SRNC relocation according to the present invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 3:
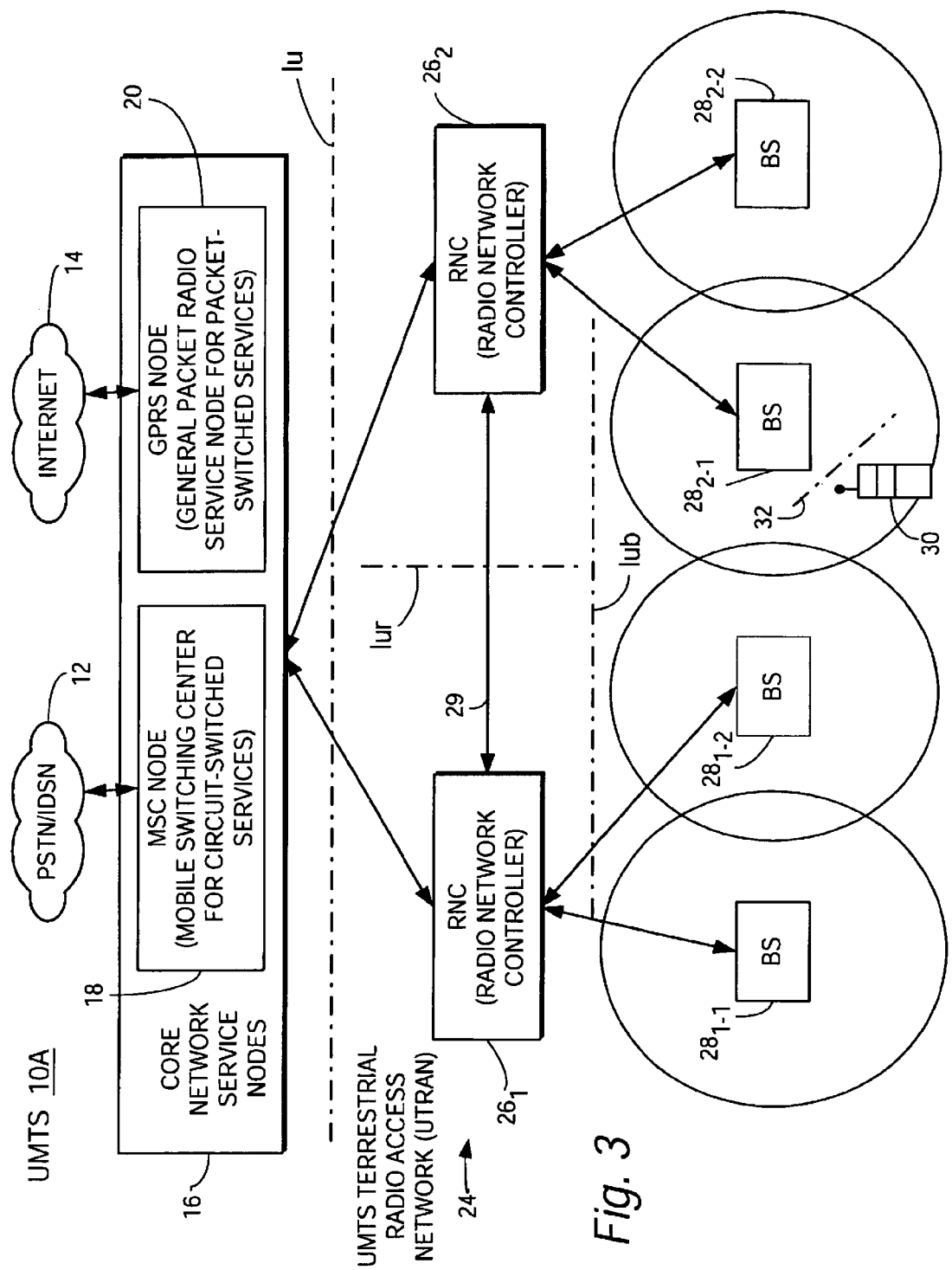
FIG. 3 is a schematic view of portions of an example, representative telecommunications system in which inventive modes of establishing radio connections and performing SRNC relocation can be implemented.

The present invention is described in the non-limiting, example context of a universal mobile telecommunications (UMTS) 10 shown in FIG. 3. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN). Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
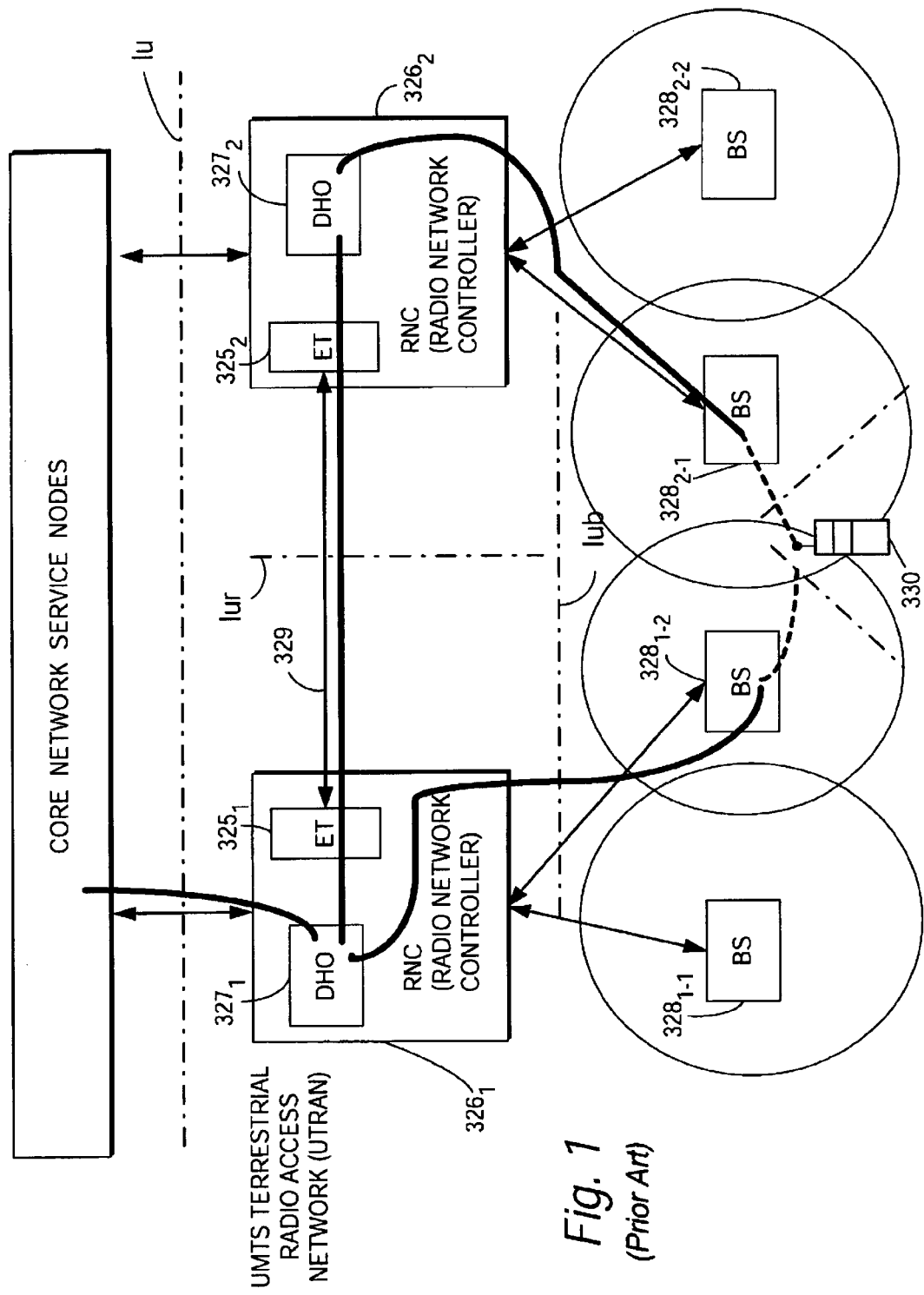
FIG. 1 is a schematic view of portions of a telecommunications system illustrating a first way of performing a SRNC relocation procedure.

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 3 is shown with only two RNC nodes, particularly RNC $26_1$ and RNC $26_2$. Each RNC 26 is connected to a plurality of base stations (BS) 28. For example, and again for sake of simplicity, two base station nodes are shown connected to each RNC 26. In this regard, RNC $26_1$ serves base station $28_{1\text{-}1}$ and base station $28_{1\text{-}2}$, while RNC $26_2$ serves base station $28_{2\text{-}1}$ and base station $28_{2\text{-}2}$. It will be appreciated that a different number of base stations can be served by each RNC, and that RNCs need not serve the same number of base stations. Moreover, FIG. 1 shows that an RNC can be connected over an Iur interface to one or more other RNCs in the URAN 24.

In the illustrated embodiments, for sake of simplicity each base station 28 is shown as serving one cell. Each cell is represented by a circle which surrounds the respective base station. It will be appreciated by those skilled in the art, however, that a base station may serve to communicate across the air interface for more than one cell. For example, two cells may utilize resources situated at the same base station site.

A user equipment unit (UE), such as user equipment unit (UE) 30 shown in FIG. 3, communicates with one or more cells or one or more base stations (BS) 28 over a radio or air interface 32. Each of the radio interface 32, the Iu interface, the Iub interface, and the Iur interface are shown by dash-dotted lines in FIG. 3.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications. Traffic channels (TCH) may be allocated to carry substantive call communications with a user equipment unit (UE).

The present invention, which can be implemented in the example context of the telecommunications system of FIG. 3, particularly concerns a new and improved technique for establishing a link or leg of a radio connection in the radio access network. The inventive technique is advantageous in the event that a SRNC relocation procedure is performed for the user equipment unit (UE) which has been participating in that link or leg of the radio connection.

Particularly, in the present invention an end-to-end signaling protocol is utilized to establish, in a radio access network of a telecommunications system, plural distinct connection segments comprising a radio link or leg of a radio connection involving a user equipment unit. An example of an end-to-end signaling protocol is Q.AAL2.

As used herein, an end-to-end protocol is a protocol which confirms connection setup to an originating node only after a full path to a terminating node is through-connected, so that the user plane is set up and user data can be exchanged between end devices at the originating node and terminating node. Setting up a connection with such an end-to-end protocol typically begins with a message such as an "establish request" message which includes chosen parameters (e.g., CID, VP/VC value, and other traffic parameters in AAL2). The establish request message is sent from an originating node to a terminating node. The terminating node returns an "establish confirm" or similar signaling message. The user plane is then set up between the terminating node and the originating node so that user data can be exchanged between devices at those nodes.

In the present invention, the plural distinct connection segments extend in series between a device in a first radio network control node and a device in a base station controlled by a second radio network control node. The first radio network control node serves as a serving radio network control (SRNC) node and the second radio network control serves as a drift radio network control (DRNC) node for the radio connection with the user equipment unit. Moreover, in the present invention the confirm establish messages provided by the end-to-end protocol for various distinct connection segments are sequenced so that the originating node does not receive an establish connection confirmation message in the connection layer until the user plane path is fully set up.

Provision of the plural distinct connection segments is advantageous when performing a SRNC relocation procedure to make the second radio network control node serve as the SRNC for the radio connection involving the user equipment unit. For example, after performance of the SRNC relocation procedure, a retained one of the plural distinct connection segments can still be utilized, e.g., a segment extending between the device in the base station controlled by the second radio network control node and a device at the second radio network control node. The retained one of the connection segments can either be utilized in series with a post-relocation connection segment to establish a path between the device in the base station controlled by the second radio network control node and a diversity handover unit at the second radio network control node, or have its endpoint moved to the diversity handover unit at the second radio network control node.

Figure 4B:
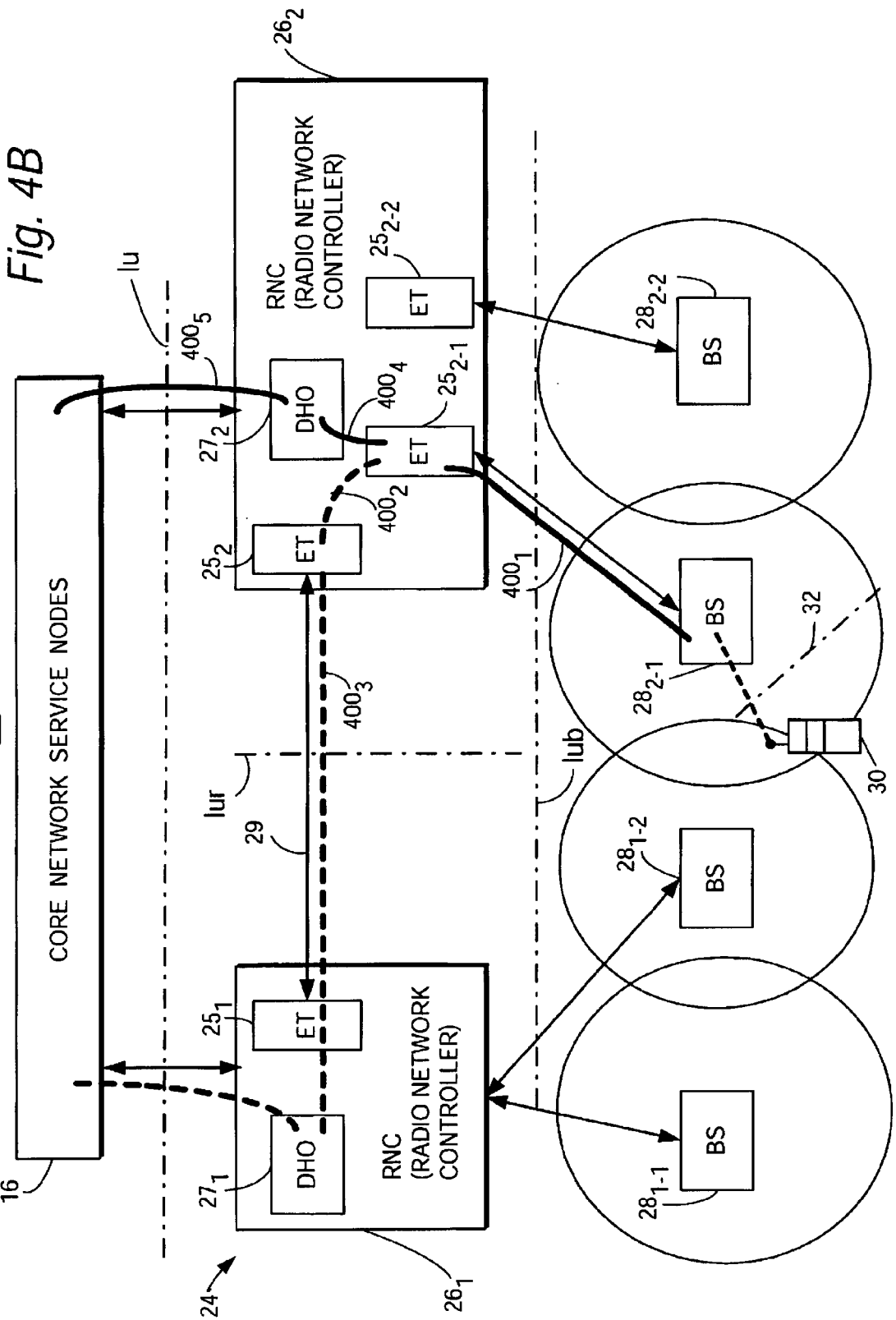
Figure 5D:
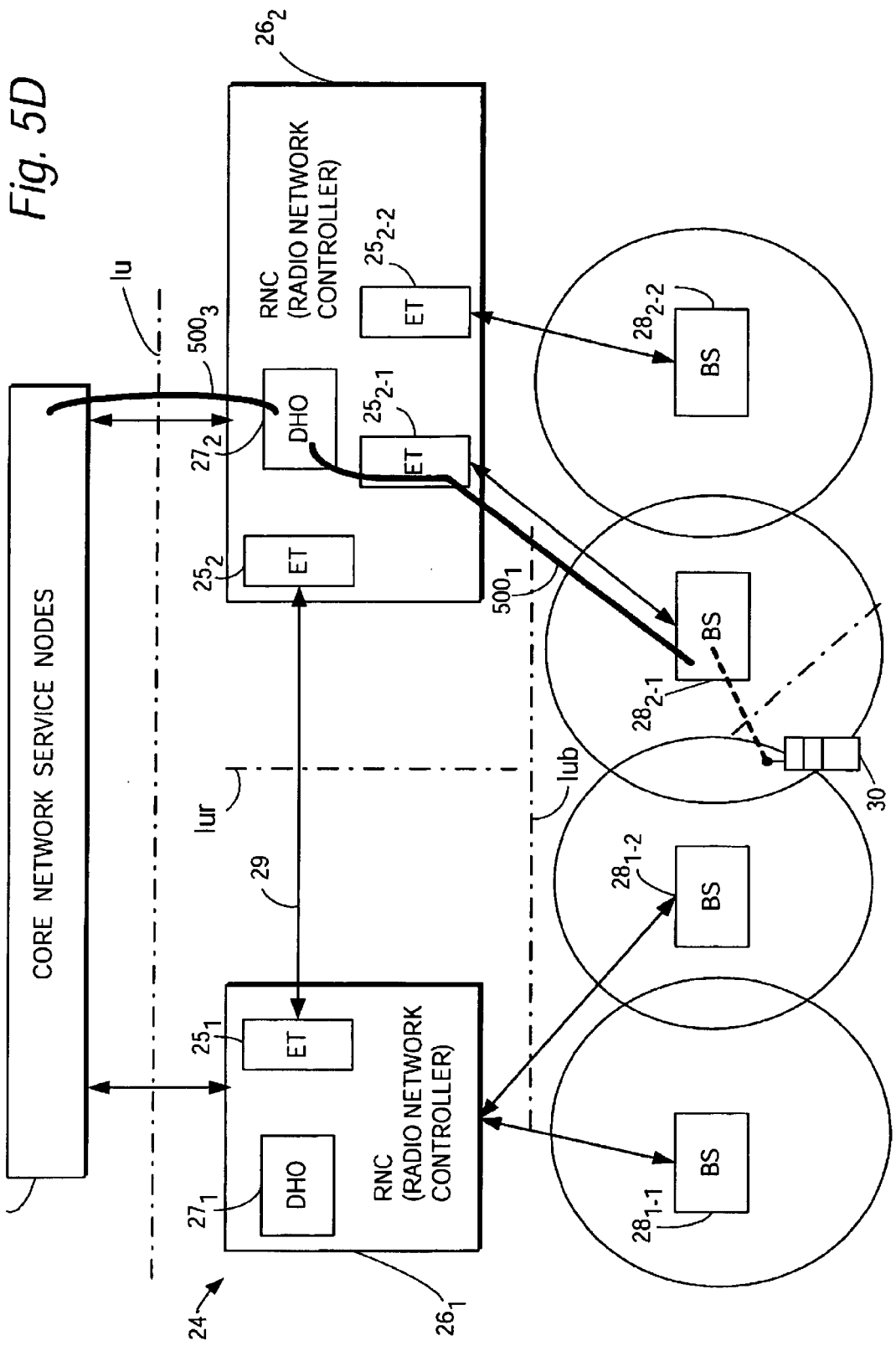

Two example modes of implementing the radio connection establishment technique of the present invention are illustrated. A first mode, known also as the three connection segment mode, is illustrated in FIG. 4A. Subsequent events involved with a SRNC relocation procedure facilitated by the first mode are illustrated in FIG. 4B and FIG. 4C. A second mode, known also as the two connection segment mode, is illustrated in FIG. 5A. Subsequent events involved with a SRNC relocation procedure facilitated by the second mode are illustrated in FIG. 5B, FIG. 5C, and FIG. 5D. Other modes of the invention, including modes having greater than three connection segments are within the scope of the present invention.

Both the first mode and the second mode are hereinafter described with reference to a user equipment unit (UE) 30 for which a radio link or leg of a radio connection is to be controlled initially by serving radio network controller (RNC) $26_1$ and set up or established via base station $28_{2-1}$. The base station $28_{2-1}$ is controlled by radio network controller (RNC) $26_2$, which initially (e.g., before SRNC relocation) functions as a drift radio network controller (DRNC).

In the three connection segment mode illustrated generally in FIG. 4A, three distinct connection segments $400_1$, $400_2$, and $400_3$ are established between serving radio network controller (RNC) $26_1$ and a device in base station $28_{2-1}$. A first of the connection segments, labeled as segment $400_1$ in FIG. 4A, is established between a first device $25_{2-1}$ at the second radio network control node (drift radio network controller (DRNC) $26_2$) and a device in base station $28_{2-1}$. Another (second) of the plural distinct connection segments, labeled as segment $400_2$ in FIG. 4A, is established between the first device $25_{2-1}$ at the second radio network control node and a second device $25_2$ at the second radio network control node. Yet another (third) of the plural distinct connection segments, labeled as segment $400_3$ in FIG. 4A, is established between the second device $25_2$ at the second radio network control node and a device $27_1$ at the first radio network control node (serving radio network controller (RNC) $26_1$).

In the three connection segment mode (as well as in the two connection segment mode hereinafter described), each one of the plural distinct connection segments are segments of a radio link. All but a node internal radio link segment (e.g., all but the second radio link segment in the three connection segment mode) are established using an end-to-end protocol, such as AAL2 signaling, for example. In other words, the end-to-end protocol (e.g., AAL2 signaling) is used to establish node-transcending radio link segments, e.g., radio link segments which do not have both connection points in a same node.

As explained hereinafter, in the present invention the confirm establish messages provided by the end-to-end protocol for various distinct connection segments are sequenced so that the originating node (the first radio network control node, i.e., serving radio network controller (RNC) $26_1$) does not receive an establish connection confirmation message in the connection layer (via the end-to-end signaling) until the user plane path is fully set up so that user data can be sent between the originating node and the terminating node (e.g., the device in base station $28_{2-1}$).

To be specific, in the illustration of FIG. 4A the third segment $400_3$ between ET device $25_2$ in drift radio network controller (DRNC) $26_2$ and device $27_1$ in serving radio network controller (RNC) $26_1$ is established or set up with AAL2 signaling; the second segment $400_2$ between ET device $25_{2-1}$ and ET device $25_2$ is established or set up using switching in drift radio network controller (DRNC) $26_2$; and the first segment $400_1$ between a device in base station $282_{2-1}$ and ET device $252_{2-1}$ is established or set up with AAL2 signaling. But the originating node (serving radio network controller (SRNC) $26_1$) does not receive an establish confirmation signaling message until the entire user plane path has been setup between the originating node and the terminating node (e.g., the device in base station $282_{2-1}$). This means that any other establish confirmation signaling sent with respect to any other connection segment (e.g., connection segment $400_1$) must be properly coordinated or sequenced. In particularly, establish confirmation signaling must be sent beginning in closest order of proximity of the corresponding connection segment to the terminating node.

The present invention thus differs from prior practice in various ways. For example, in prior practice usage of an end-to-end signaling protocol would mean set up or establishment of a radio link between end points of the device $27_1$ and a device in base station $28_{2-1}$.

In the illustrated embodiment, the first device $25_{2-1}$ and the second device $25_2$ at the second radio network control node $26_2$ respectively can be or include a first connection point and a second connection point (e.g., at/in a first extension terminal [ET] and a second extension terminal [ET], respectively). In such implementation, the ET device $25_2$ serves to interface drift radio network controller (DRNC) $26_2$ over inter-RNC link 29 to serving radio network controller (RNC) $26_1$. ET device $25_{2-1}$ and ET device $25_{2-2}$ serve to interface or connect drift radio network controller (DRNC) $26_2$ to base station $28_{2-1}$ and base station $28_{2-2}$, respectively.

Thus, in the illustrated embodiment, connection points are situated at the first device $25_{2-1}$ and the second device $25_2$ at the second radio network control node $26_2$. The term "connection point" is utilized since at these devices the end-to-end signaling protocol sets up a connection segment endpoint for each connection segment. In the illustrated embodiment wherein Q.AAL2 is employed to setup AAL2 channels, AAL2 channels are multiplexed onto ATM virtual channels (VCs) [multiplexing being utilized for different layers]. Therefore, while "connection point" is the more generic descriptor for such points, in the more specific illustrated case of AAL2 such points are also herein referred to as "multiplexing points".

As mentioned above, in the illustrated embodiment extension terminals (ETs) serve as specific examples of first device $252_{2-1}$ and the second device $252_2$. Various aspects of extension terminals (sometimes referred to as "exchange terminals") are generally described, e.g., in one or more of the following (all of which are incorporated herein by reference): U.S. Pat. No. 6,128,295; U.S. patent application Ser. No. 09/249,785, entitled "ESTABLISHING INTERNAL CONTROL PATHS IN ATM NODE", tiled Feb. 16, 1999; U.S. Pat. No. 6,128,295; U.S. Pat. No. 6,088,359; U.S. Pat. No. 5,963,553; U.S. Pat. No. 6,154,459; and U.S. Pat. No. 6,034,958.

Figure 10:
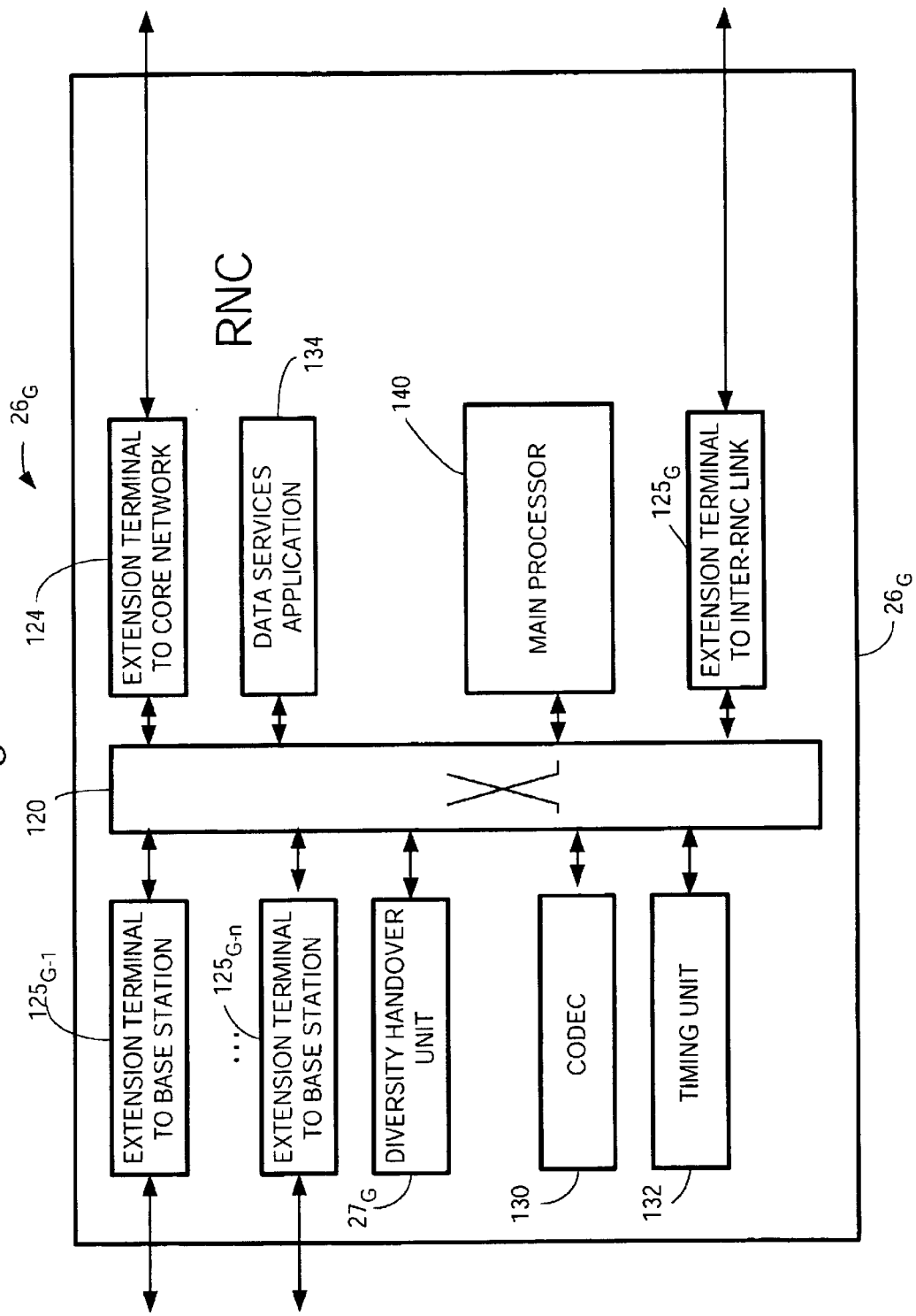
FIG. 10 is a schematic view of an example, representative RNC node which can be utilized with an implementation of the invention.

The drift radio network controller (DRNC) $26_2$ comprises a diversity handover unit (DHO) $27_2$ shown in FIG. 3, as well as other units and boards not illustrated. Among the other units of drift radio network controller (DRNC) $26_2$ not illustrated in FIG. 3 can be a switch (e.g., a cell or packet switch) for interconnecting the constituent elements of drift radio network controller (DRNC) $26_2$. Although such a switch is not shown in FIG. 3, an example radio network controller having such a switch is shown in FIG. 10.

In the illustrated embodiment, the device $27_1$ is a diversity handover unit (DHO). The device $27_1$ is in serving radio network controller (RNC) $26_1$, which is involved in the third connection segment $400_3$ of FIG. 4A. The serving radio network controller (RNC) $26_1$ also has extension terminals in like manner as drift radio network controller (DRNC) $26_2$ already-described, including extension terminal ET $25_1$ which serves to interface serving radio network controller (RNC) $26_1$ over inter-RNC link 29 to drift radio network controller (DRNC) $26_2$. Although not shown in FIG. 4A, the person skilled in the art will appreciate that extension terminals (ETs) can also be employed for connection to each of the base stations controlled by serving radio network controller (RNC) $26_1$. Furthermore, the serving radio network controller (RNC) $26_1$ can also have a switch for interconnecting its constituent elements.

As mentioned above, the modes of the present invention are particularly advantageous for facilitating subsequent performance of a SRNC relocation or moveover procedure. It will be recalled from the previous discussion that an SRNC relocation procedure occurs when it is determined that the role of a serving radio network controller (SRNC) for a radio connection involving a user equipment unit (UE) should be moved from one radio network controller to a node which, prior to the SRNC relocation, had been serving as a drift radio network controller (DRNC).

FIG. 4B and FIG. 4C illustrate certain basic actions pertaining to a SRNC relocation performed after a radio link has been set up in accordance with the three connection segment mode of FIG. 4A. Advantageously the first connection segment $400_1$ can be retained after completion of the SRNC relocation to comprise the radio connection with user equipment unit (UE) 30. The first connection segment $400_1$ is the connection segment between base station $28_{2-1}$ and ET device $25_{2-1}$. FIG. 4B shows that, upon implementing SRNC relocation, the first connection segment $400_1$ can still be utilized, along with two new additional connection segments, e.g., connection segment $400_4$ and connection segment $400_5$. The new connection segment $400_4$ is established or set up between ET device $25_{2-1}$ of serving radio network controller (RNC) $26_1$ and the diversity handover unit (DHO) $27_2$ of drift radio network controller (DRNC) $26_2$. The new connection segment $400_5$ is established or set up between the diversity handover unit (DHO) $27_2$ of drift radio network controller (DRNC) $26_2$ and the core network 16. Both the new connection segment $400_4$ and new connection segment $400_5$, like connection segment $400_1$ before them, are preferably set up using an end-to-end signaling protocol such as AAL2.

FIG. 4B also shows by broken lines that the former second connection segment $400_2$ and former third connection segment $400_3$ are no longer needed after the SRNC relocation. FIG. 4C shows that, after SRNC relocation, the former second connection segment $400_2$ and former third connection segment $400_3$ have been broken down, leaving only the retained connection segment $400_1$, new connection segment $400_4$, and new connection segment $400_5$.

Thus, subsequent to performance of the SRNC relocation procedure, the first connection segment $400_1$ is utilized in series with two post-relocation connection segments, e.g., new connection segment $400_4$ and new connection segment $400_5$, to establish a path (e.g., radio link or leg) between a device in the base station controlled by the second radio network control node (e.g., base station $28_{2-1}$) and the core network 16.

In the two connection segment mode illustrated generally in FIG. 5A, two distinct connection segments $500_1$ and $500_2$ are established between serving radio network controller (RNC) $26_1$ and base station $28_{2-1}$. A first of the connection segments, labeled as segment $500_1$ in FIG. 5A, is established between a device (e.g., device $25_2$) at the second radio network control node (drift radio network controller (DRNC) $26_2$) and a device in base station $28_{2-1}$. Another (second) of the plural distinct connection segments, labeled as segment $500_2$ in FIG. 5A, is established between the device (e.g., device $25_2$) at the second radio network control node and a device (e.g., device $27_1$) at the first radio network control node. Thus, in contrast to the three connection segment mode, in the two connection segment mode the first segment, e.g., the segment $500_1$ having a first end point connected to base station $28_{2-1}$ has its second endpoint connected to ET device $25_2$ rather than to ET device $25_{2-1}$.

In the two connection segment mode, each one of the plural distinct connection segments are segments of a radio link. As in the three connection segment mode, each such radio link segment is established using an end-to-end protocol, such as AAL2 signaling, for example. To be specific, the second segment $500_2$ between ET device $25_2$ and DHO $27_1$ is established or set up with AAL2 signaling; and the first segment $500_1$ between the device in base station $28_{2-1}$ and ET device $25_2$ is established or set up with AAL2 signaling. In like manner as the three connection segment mode, establish confirmation signaling must be sent beginning in closest order of proximity of the corresponding connection segment in the terminating node (e.g., base station $28_{2-1}$), so that the originating node (e.g., serving radio network controller (SRNC) $26_1$ at which DHO $27_1$ is situated) receives establish confirmation signaling only after the entire user plane path has been setup. It is again mentioned that this differs from prior practice, since in prior practice usage of an end-to-end signaling protocol would mean set up or establishment of a radio link between end points of the device $27_1$ and a device in base station $28_{2-1}$.

In the two connection segment mode, a first connection segment $500_1$ is referred to as a first or retainable one of the plural distinct connection segments. The device in drift radio network controller (DRNC) $26_2$ which forms a second endpoint of the first connection segment $500_1$ is, in the illustrated example embodiment, a connection point (e.g., multiplexing point at an extension terminal [ET]) situated between an unillustrated switch of the second radio network control node $26_2$ and the inter-RNC link 29 to the first radio network control node $26_1$. Although the switch comprising the example, representative drift radio network controller (DRNC) $26_2$ is unillustrated in FIG. 5A, its nature and operation will be understood from the example node shown in and subsequently described with reference to FIG. 10.

FIG. 5B, FIG. 5C, and FIG. 5D illustrate certain basic actions pertaining to a SRNC relocation performed after a radio link has been set up in accordance with the two connection segment mode of FIG. 5A. FIG. 5B shows that the SRNC relocation will involve a new connection segment $500_3$ which extends between core network 16 and the DHO device $27_2$ of drift radio network controller (DRNC) $26_2$. The new connection segment $500_3$, like connection segment $500_1$ before it, is preferably set up using an end-to-end signaling protocol such as AAL2.

Further, as shown by arrow S in FIG. 5C, a second endpoint of connection segment $500_1$ is moved from ET device $25_2$ to the DHO device $27_2$. The first connection segment $500_1$ is the connection segment which has its first endpoint connected to base station $28_{2-1}$. With its second endpoint thusly moved, the first connection segment $500_1$ can be retained after completion of the SRNC relocation to comprise the radio connection with user equipment unit (UE) 30.

FIG. 5C also shows by broken lines that the former second connection segment $500_2$ is no longer needed after the SRNC relocation. FIG. 5D shows that, after SRNC relocation, the former second connection segment $500_2$ has been broken down, leaving only the retained connection segment $500_1$ and new connection segment $500_3$.

Thus, subsequent to performance of the SRNC relocation procedure, the first connection segment $500_1$, with its second endpoint moved within drift radio network controller (DRNC) $26_2$, is utilized in series with post-relocation connection segment $400_3$, to establish a path (e.g., radio link or leg) between the base station controlled by the second radio network control node (e.g., base station $28_{2-1}$) and the core network 16.

FIG. 10 illustrates, in somewhat more detail, an example non-limiting RNC node $26_G$ of the present invention. RNC node $26_G$ of FIG. 10 can represent an serving RNC (SRNC) or a drift RNC (DRNC). It so happens that the RNC node 26 of FIG. 10 is a switched-based node having a switch 120. The switch 120 serves to interconnect other constituent elements of RNC node $26_G$. Such other constituent elements include extension terminals [ETs] $125_{G-1}$ through $125_{G-n}$, extension terminal $125_1$ which connects RNC node $26_G$ via the inter-RNC link 29 to another radio network controller; and extension terminal 124. Extension terminals $125_{G-1}$ through $125_{G-n}$ essentially function to connect RNC node $26_G$ to the base stations 28 served by RNC node $26_G$; extension terminal 124 connects RNC node 26 across the Iu interface to the core network 16. Yet other constituent elements of RNC node $26_G$ include diversity handover unit $27_G$; codex 130; timing unit 132; a data services application unit 134; and, a main processor 140.

Figure 11:
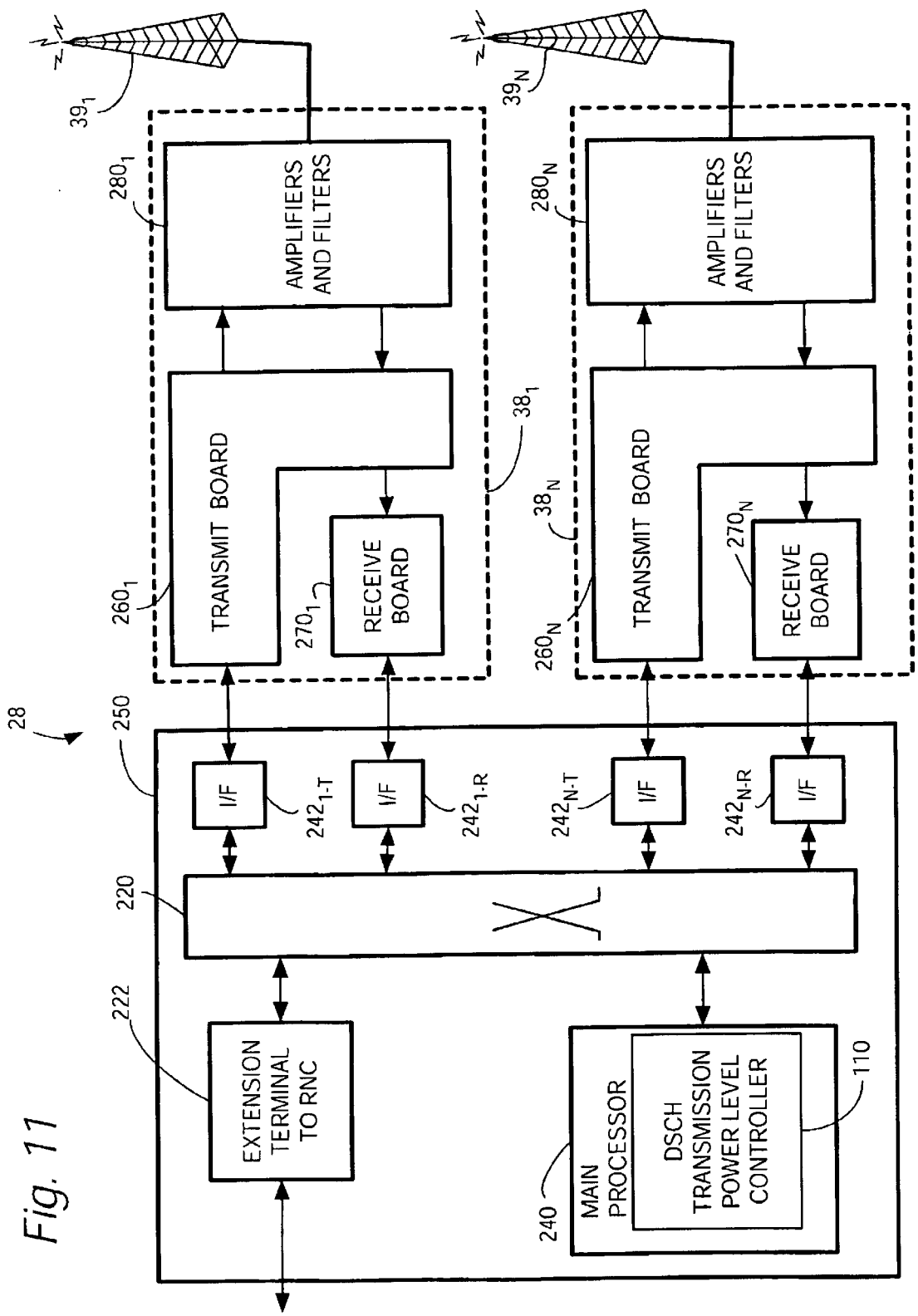
FIG. 11 is a schematic view of an example, representative base station node which can be utilized with an implementation of the invention.

FIG. 11 illustrates, in non-limiting manner, more details of an example base station (BS) node 28 in accordance with one embodiment of the present invention. As with RNC node 26, the base station (BS) node 28 of FIG. 11 is a switched-based node having a switch 220 which serves to interconnect other constituent elements of base station (BS) node 28. Such other constituent elements include extension terminal (ET) 222; BS main processor 240, and interface (IF) boards 242. It is an interface board 242 which, in the scenario of FIG. 4A and FIG. 5A, is the device in the base station $28_{2-1}$ which serves as the first endpoint of the first connection segment. This interface board 242 is sometimes referred to as the RX/TX device.

Extension terminal (ET) 222 connects base station (BS) node 28 to radio network controller (RNC) node 26, and thus comprises the Iub interface. Preferably included in the extension terminal 222 is a function which provides, e.g., multiplexing and demultiplexing and (optionally) queuing with regard to differing protocols of cells. Alternatively, a separate unit which performs these functions can be situated in BS $28_{2-1}$ external to extension terminal ET.

Figure 2:
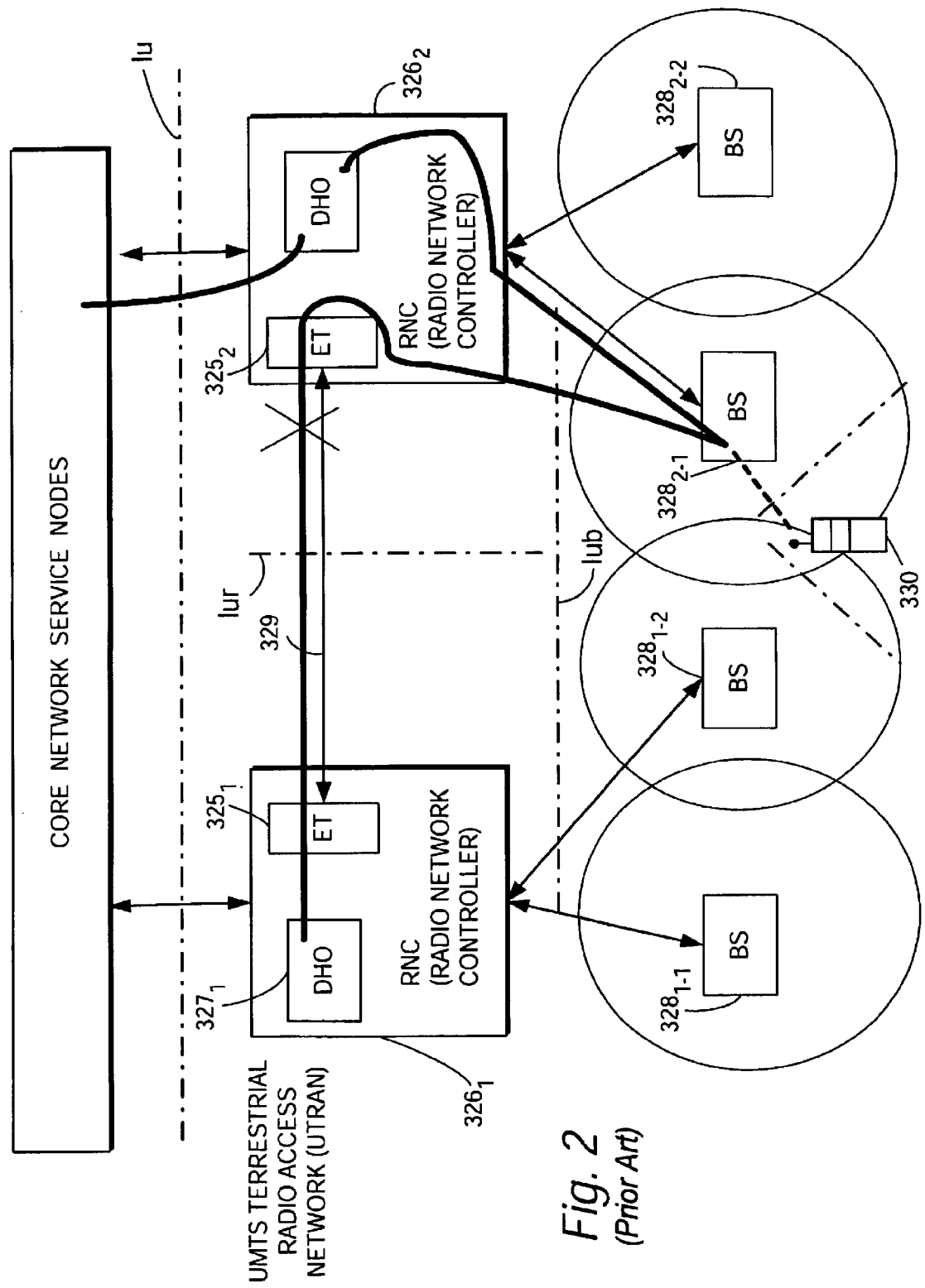
FIG. 2 is a schematic view of portions of a telecommunications system illustrating a second way of performing a SRNC relocation procedure.

The embodiment of base station (BS) node 28 illustrated in FIG. 11 is housed in a rack having multiple subracks. Each subrack has one or more boards, e.g., circuit boards, mounted thereon. A first subrack 250 contains boards for each of extension terminal 222; BS main processor 240, and interface boards 242. Each of the interface boards 242 is connected to a board on another subrack, e.g., one of the transmitter boards 260 or one of the receiver boards 270. Each receiver board 270 is connected to share certain transmitter/receiver resources in a corresponding transmitter board 260, with the transmitter board 260 being connected to a corresponding one of amplifiers and filters board 280. The amplifiers and filters board 280 is connected to an appropriate antenna 39. For example, interface board $242_{1-T}$ is connected to transmitter board $260_1$, while interface board $242_{1-R}$ is connected to receiver board $270_1$. The pair of transmitter board $260_1$ and receiver board $270_1$ is, in turn, connected to amplifiers and filters board $280_1$. Similar connections exist for a second pairing of transmitter board $260_2$ and receiver board $270_2$, which interface via interface board $242_{2-T}$ and interface board $242_{2-R}$, respectively. Each transceiver 38 of FIG. 2 thus comprises a subrack which includes a transmitter board 260, a receiver board 270, and amplifiers and filters board 280.

In one example, non-limiting embodiment, base station (BS) node 28 is an ATM-based node, with interface boards 242 performing various ATM interfacing functions. The transmitter boards 260 and receiver boards 270 each include several devices. For example, each transmitter board 260 includes unillustrated elements such as an interface connected to its corresponding interface board 242; an encoder; a modulator; and, a baseband transmitter. In addition, the transmitter board 260 includes the transmitter/receiver resources which it shares with receiver board 270. Each receiver board 270 includes unillustrated elements such as an interface connected to its corresponding interface board 242; a decoder; a demodulator; and, a baseband receiver. Each amplifiers and filters board 280 includes amplifiers, such as MCPA and LNA amplifiers.

The distinct plural radio connection or link segments of the present invention can be established using binding information to bind together a call layer and a connection layer. In this regard, telecommunications networks are typically conceptualized as having layered functionalities. The physical layer comprises a network of switches and cables (e.g., trunk lines) which are employed to connect devices (e.g., telephones, either mobile or stationary) involved in a call (e.g., a "connection"). The connection layer is an abstraction that comprises a model of the physical network. Connection handling (which is performed over the connection layer) relates to the set up and release of connections and to the control of the physical telecommunications network. The call layer is involved in service handling, which includes service control, service execution, service signaling, service installation, service modification, and service administration. Within each layer information is transferred over signaling entities within the layer.

In some telecommunication systems, the call layer information and the connection layer information is signaled and routed along the same path from a call origin to a call destination. In such case, the resources needed for the call establishment are reserved hop by hop (e.g., as the information is signaled and routed from switch to switch through the physical network). As the call layer and connection layer are therefore closely coupled to each other, the binding between the call layer and the connection layer is resolved in runtime.

Modem telecommunication networks usually have the call layer and the connection layer separated from one another. As a consequence of the separation of the call layer and the connection layer, different networks are used for the call establishment and the connection establishment. The two networks (the call layer network and the connection layer network) usually have different topologies.

In operation, in setting up a call usually a call layer connection is initially established over the call layer network between two devices. Typically establishing the call layer connection involves exchange of control information that does not need any user plane (e.g., physical layer) connection. Subsequently, when a user plane connection is needed over the physical layer, a connection is established in the connection layer.

The two connections—the call layer connection and the connection layer connection—are routed from the same origin to the same destination. However, in view of the differing topologies of the call layer network and the connection layer network, the two connections do not have to be routed along the same path. The advantage of separate routing of the call layer connection and the connection layer connection is that resources for the user plane connection are only reserved and used when needed. Examples of call and connection separated telecommunications networks are provided in the following, all of which are incorporated herein by reference in their entirety: Swedish Patent Application 9601605-0, filed Apr. 26, 1996; U.S. Pat. No. 5,809,129; and, U.S. Pat. No. 5,710,882.

The separation of the call layer and the connection layer does, however, require some type of mechanism to bind the two layers to each other at certain nodes where the two layers meet. The signaling protocol of each layer needs to carry the binding mechanism, e.g., binding information. Typically, existing networks with existing protocols are used, and the binding information must be fit into already defined information entities within those protocols.

In the above regard, both in a core network and in a radio access network, the call layer generally uses a signaling system No. 7 (SS7) network or a TCP/IP network for call control signaling. On top of the SS7 or the TCP/IP protocol stacks there is an application protocol, such as RNSAP or RANAP. The RNSAP and RANAP protocols are used end-to-end in the network. Application specific resources, such as diversity handover units (DHOs) and codecs (coders/decoders) are handled and reserved at the call layer.

Figure 6:
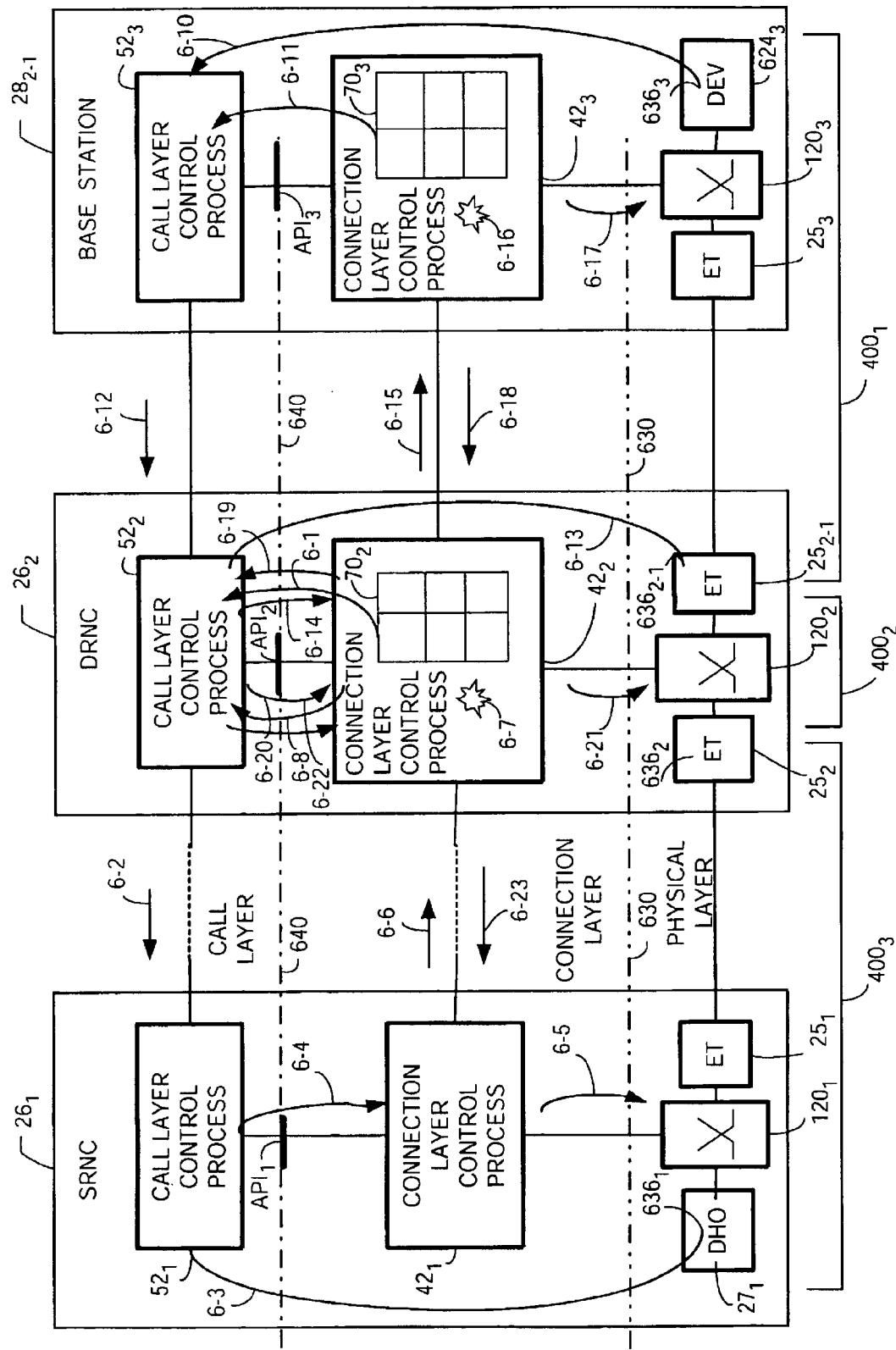
FIG. 6 is a diagrammatic view showing stages of a call layer and connection layer binding technique for the first example mode of the invention.

In one of its aspects, the present invention provides various binding information techniques for the multiple connection segment modes when the call and the connection layers are separated in a telecommunications network. An example binding technique for the three connection segment mode (of FIG. 4A–FIG. 4C) is illustrated in FIG. 6. FIG. 6 shows, from a layering perspective, the three nodes of the serving radio network controller (SRNC) $26_1$, the drift radio network controller (DRNC) $26_2$, and the base station $28_{2\text{-}1}$. In FIG. 6, a physical layer is illustrated as being below dashed double-dotted line 630. The physical layer comprises a network of switches and cables or links (e.g., trunk lines) which are employed to connect devices such as diversity handover unit (DHO) $27_1$ and device $624_3$. In the illustrated embodiment, each of the three nodes has a switch, e.g., switch $120_1$ for serving radio network controller (SRNC) $26_1$; switch $120_2$ for drift radio network controller (DRNC) $26_2$; and switch $120_3$ for base station $28_{2\text{-}1}$. To a switch port of switch $120_1$ which are outgoing from end node $26_1$ is connected extension terminal $25_1$, only one such extension terminal $25_1$ being shown in FIG. 6 for sake of simplification. Likewise, respective switch ports of switch $120_2$ of drift radio network controller (DRNC) $26_2$ are connected to extension terminals $25_2$ and $25_{2\text{-}1}$, which have been discussed above. A switch port of switch $27_3$ of base station $28_{2\text{-}1}$ is connected to extension terminal $25_3$. As is understood to those skilled in the art, it is through extension terminals such as extension terminals 25 in FIG. 6 that a switch is connected in the physical layer to other nodes.

The information used to identify a connection endpoint, known herein as connection endpoint information, varies from switch to switch, and depends on conventions of the switch vendor/manufacturer. The connection endpoint information can thus be vendor specific for a physical layer entity, and may take the form of a concatenation of one or more of a node identifier, a hardware cabinet rack, a hardware slot, a hardware port, and a resource, for example.

The connection layer is shown in FIG. 6 above the physical layer, e.g., between dashed double-dotted line 630 and dash dotted line 640. In each node, the connection layer includes a connection layer control process. For example, a connection layer control process $42_1$ is performed at serving radio network controller (SRNC) $26_1$, a connection layer control process $42_2$ is performed at drift radio network controller (DRNC) $26_2$; and a connection layer control process $42_3$ is performed at base station $28_{2\text{-}1}$. The call layer is shown in FIG. 6 above the connection layer, e.g., above dash dotted line 640. In each node, the call layer includes a connection layer control process. Again by way of example, a call layer control process $52_1$ is illustrated in FIG. 6 for serving radio network controller (SRNC) $26_1$; a call layer control process $52_2$ is illustrated for drift radio network controller (DRNC) $26_2$; and a call layer control process $52_3$ is illustrated for base station $28_{2-1}$.

In general, whenever a user plane connection is needed to be set up in the physical layer, an order is given in the form of a connection request from the call layer to the connection layer. The connection endpoints of the application specific resources must be addressable at the connection layer. The connection is established using an appropriate connection layer signaling protocol, e.g., B-ISUP signaling for ATM connections or Q.AAL2 for AAL2 connections. The connection layer signaling is routed through the connection layer and controls reservation and through connection of connection layer resources (e.g., switches and extension terminals) along the path to the destination end node.

An example of using binding information for the three connection segment mode of the present invention is described with reference to certain example basic actions in FIG. 6. In FIG. 6 and similar figures, the term "connection point" encompasses endpoints of the connection segments described above. Moreover, when the connection segment endpoint is also an endpoint of the overall connection, the further refined term "connection endpoint" may be employed for more specificity.

Concerning first the third segment $400_3$ (see FIG. 4A), as action 6-1 the call layer (more specifically call layer control process $52_2$ at drift radio network controller (DRNC) $26_2$) obtains a binding reference to represent a connection point associated with the connection point (e.g., multiplexing point) furnished by extension terminal $25_2$. Since the connection points are selected by the connection layer, when setting up the connection a table, such as table 70 maintained by connection layer process $70_2$, cannot reserve a connection point in advance. Therefore, in accordance with one aspect of the present invention, the value of the binding reference obtained as action 6-1 can be in a predetermined range which is reserved for setting up network-wide AAL2 connections to a connection/multiplexing point (e.g., a predetermined range binding reference values which specifies that the connection is to be routed to an incoming connection/multiplexing point, and therefore is a connection point corresponding to an endpoint of a segment). The terminating node can then, by examining the binding reference, determine from the range to which the binding reference belongs that it is for setup of a connection segment. The binding reference can be obtained from the connection layer, or alternatively obtained from the call layer. FIG. 6 particularly shows as action 6-1 obtaining the binding reference. The binding reference can be obtained, but does not have to be obtained, from a table such as table $70_2$. Table $70_2$ associates the binding reference with the appropriate connection point, e.g., connection point $636_2$ at extension terminal $25_2$ in FIG. 6. The connection point is described by connection point information which, as mentioned above, can be vendor specific information.

As an example, the binding information can be standardized for Q.AAL2. In particular, such binding information is standardized in ITU-T Q.2630.1 to be a fixed size field of four octets. The binding information is named "Served User Generated Reference" (SUGR) in the Q.2630.1 specification. However, the ITU-T Q.2630.1 standard does not limit or imply anything regarding how those values are assigned to the SUGR.

Another possibility for obtaining the connection point is to have table $70_2$ associate a binding reference (e.g., any appropriate SUGR value) and a predetermined value, e.g., a predetermined or null value employed specifically for this purpose, instead of a connection point value. Upon finding the predetermined (e.g., null) value associated with a binding reference in table $70_2$, the connection layer knows it is a segment setup and that the connection is only to be routed to the connection point. In this situation any SUGR value can be used and no SUGR range has to be reserved. Alternatively, these two techniques can be used in conjunction with one another—both a predefined range and also the predetermined or null value can be employed as a precaution.

As action 6-2, the call layer control process $52_2$ of drift radio network controller (DRNC) $26_2$ transmits a call layer signaling message to serving radio network controller (SRNC) $26_1$. The call layer signaling message of action 6-2 can include the binding information (BI) and an ATM end system address (AESA) of drift radio network controller (DRNC) $26_2$ in FIG. 6. The call layer signaling message of action 6-2 can be in the form of an appropriate existing protocol, such as RANAP, RNSAP, and NBAP when the telecommunications network is a radio access network known as UTRAN. In any call and connection separated network the call layer must extend this information in order to make it possible for the connection layer to route the connection. As is understood generally and illustrated subsequently, the AESA of drift radio network controller (DRNC) $26_2$ carried in the call layer signaling message is used for signal routing to drift radio network controller (DRNC) $26_2$.

The concept of ATM end system address (AESA) is described, e.g., in section 73.0 of *ATM User-Network Interface (UNI) Signaling Specification*, Version 74.0, af-sig-0061.00, July 1996, generated by the ATM Forum Technical Committee, which specifies the use of standard ATM addresses for private and public networks. In general, and AESA has an initial domain part (IDP) and a domain specific part (DSP). The initial domain part (IDP) comprises two fields: the authority and format identifier (AFI) and the initial domain identifier (IDI). The domain specific part (DSP) is subdivided into a high order DSP (HO-DSP) and a low order part which consists of the end system identifier (ESI) and a selector (SEL).

Upon receipt of the call layer signaling message of action 6-2, as action 6-3 the call layer control process $52_1$ of serving radio network controller (SRNC) $26_1$ reserves a connection endpoint at serving radio network controller (SRNC) $26_1$. As illustrated in FIG. 6, the particular connection endpoint reserved by action 6-3 is connection endpoint $636_1$ on/at DHO device $27_1$. Thereafter, as action 6-4, the call layer control process $52_1$ sends a connection request signaling message to the connection layer. The connection request signaling message sent to the connection layer as action 6-4 includes the AESA of drift radio network controller (DRNC) $26_2$, the binding information, and the connection endpoint reserved at action 6-3 (e.g., connection endpoint $636_1$).

As a result of receipt of the connection request of action 6-4, as action 6-5 the connection layer control process $42_1$ handles the extension terminal $25_1$ and through connects switch $120_1$ so that endpoint $636_1$ is connected to extension terminal $25_1$. Action 6-6 involves the routing of connection layer signaling through the connection layer from serving radio network controller (SRNC) $26_1$ to drift radio network controller (DRNC) $26_2$. The connection layer signaling can be, for example, an "establish request" message and includes the binding information and the AESA of drift radio network controller (DRNC) $26_2$. The connection layer signaling message of action 6-6 can be in any of several protocols, including Q.AAL2, B-ISUP, and PNNI. B-ISUP and PNNI are examples of protocols used to set up ATM connections, although not used in 3GPP (since AAL2 is standardized).

Upon receipt of the connection layer signaling (establish request message) of action 6-6, the connection layer control process $42_2$ in the connection layer at drift radio network controller (DRNC) $26_2$ accesses the binding information included therein. Using the binding information obtained from the connection layer signaling, as action 6-7 the connection layer control process $42_2$ accesses table $70_2$ to obtain the appropriate connection point information, i.e., the connection endpoint information for connection point $636_2$. The call layer control process $52_2$ at drift radio network controller (DRNC) $26_2$ then gets an indication (represented by event 6-8) that the connection segment has been routed to a connection/multiplexing point (e.g., extension terminal $25_2$) in drift radio network controller (DRNC) $26_2$.

Having described above usage of binding information for setting up the third connection segment $400_3$ of the three connection segment mode, attention now turns to setting up of the first connection segment $400_1$ between extension terminal $25_{2\text{-}1}$ at drift radio network controller (DRNC) $26_2$ and the base station $28_{2\text{-}1}$ (particularly device $624_3$ at base station $28_{2\text{-}1}$). As hereinafter exemplified, the device $624_3$ at base station $28_{2\text{-}1}$ can be an interface which has a transmit/receive (TX/RX) function, for example.

Concerning the first connection leg $400_1$ of the three connection segment mode, as action 6-10 at base station $28_{2\text{-}1}$ the call layer (more specifically call layer control process $52_3$) reserves a connection endpoint (e.g., connection endpoint $636_3$). The connection endpoint is described by connection endpoint information which, as mentioned above, can be vendor specific information (e.g., a concatenation of node, cabinet rack, slot, port, and resource). As action 6-11, the call layer (more specifically call layer control process $52_3$ at base station $28_{2\text{-}1}$) obtains a binding reference to represent a connection endpoint $636_3$. As with action 6-1 previously discussed, the binding reference of action 6-11 can be obtained from the connection layer, or alternatively obtained from the call layer. FIG. 6 particularly shows as action 6-11 obtaining the binding reference from a table $70_3$ maintained by the connection layer control process $42_3$.

As action 6-12, the call layer control process $52_2$ of base station $28_{2\text{-}1}$ transmits a call layer signaling message to drift radio network controller (DRNC) $26_2$. The call layer signaling message of action 6-12 can include the binding information (BI) obtained as action 6-11 and an ATM end system address (AESA) of base station $28_{2\text{-}1}$. As with the comparable message of action 6-2, the call layer signaling message of action 6-12 can be in the form of an appropriate existing protocol, such as RANAP, RNSAP, and NBAP when the telecommunications network is a radio access network known as UTRAN.

Upon receipt of the call layer signaling message of action 6-12, as action 6-13 the call layer control process $52_2$ of drift radio network controller (DRNC) $26_2$ reserves a second connection point for connection segment $400_1$. As illustrated in FIG. 6, the particular connection point reserved by action 6-13 is connection point $636_{2\text{-}1}$ representing a connection/multiplexing point provided by extension terminal $25_{2\text{-}1}$. Thereafter, as action 6-14, the call layer control process $52_2$ sends a connection request signaling message to the connection layer. The connection request signaling message sent to the connection layer as action 6-14 includes the AESA of base station $28_{2\text{-}1}$, the binding information, and the connection point reserved at action 6-13 (e.g., connection point $636_{2\text{-}1}$).

Action 6-15 involves the routing of connection layer signaling (e.g., an establish request message) through the connection layer from drift radio network controller (DRNC) $26_2$ to base station $28_{2\text{-}1}$. The connection layer signaling of action 6-15 includes the binding information and the AESA of base station $28_{2\text{-}1}$. In like manner as stated previously, the connection layer signaling message of action 6-15 can be in any of several protocols, including Q.AAL2, B-ISUP, and PNNI.

Upon receipt of the connection layer signaling of action 6-15, the connection layer control process $42_3$ in the connection layer base station $28_{2\text{-}1}$ accesses the binding information included therein. Using the binding information obtained from the connection layer signaling, as action 6-16 the connection layer control process $42_3$ accesses table $70_3$ to obtain the appropriate connection endpoint information, i.e., the connection endpoint information for connection endpoint $636_3$. Then, as action 6-17 the call layer control process $52_3$ at base station $28_{2\text{-}1}$, using the vendor-specific connection endpoint information acquired from table $70_3$, issues signals to through connect switch $120_3$, so that the connection endpoint $636_3$ associated with the connection endpoint information is through connected to device $624_3$.

Action 6-18 of FIG. 6 shows that, upon through connection of switch $120_3$ as above described relative to action 6-17, the connection layer control process $42_3$ at the terminating node (e.g., base station $28_{2\text{-}1}$) sends an establish confirm signaling message to drift radio network controller (DRNC) $26_2$. As explained herein, it is imperative that the establish confirm message of action 6-18 be sent before any establish confirm message is provided to the originating node, e.g., to serving radio network controller (SRNC) $26_1$. Upon receipt of the establish confirm message of action 6-18, as action 6-19 the connection layer control process $42_2$ at drift radio network controller (DRNC) $26_2$ sends a confirm notification indication to call layer control process $52_2$ at drift radio network controller (DRNC) $26_2$.

Concerning the second connection segment $400_2$ (see FIG. 4A), the call layer control process $52_2$ at drift radio network controller (DRNC) $26_2$ connects connection point $636_2$ (on extension terminal $25_2$) and connection point $636_{2\text{-}1}$ (on extension terminal $25_{2\text{-}1}$) with a node-internal connection through switch $120_2$. In this regard, FIG. 6 shows as action 6-20 the call layer control process $52_2$ at drift radio network controller (DRNC) $26_2$ issuing a connection request to connection layer control process $42_2$ to implement the node-internal connection, and action 6-21 in turn shows connection layer control process $42_2$ issuing command(s) to the physical layer to through connect switch $120_2$ for connecting connection point $636_2$ and connection point $636_{2\text{-}1}$.

After switch $120_2$ is through connected in the manner described by action 6-21, and since the establish confirm message of action 6-18 has been received from base station $28_{2\text{-}1}$, as action 6-22 call layer control process $52_2$ of drift radio network controller (DRNC) $26_2$ requests over application programmable interface $API_2$ that connection layer control process $42_2$ send an establish confirm message from drift radio network controller (DRNC) $26_2$ to serving radio network controller (RNC) $26_1$. FIG. 6 shows that, as action 6-23, the connection layer control process $42_2$ sends an establish confirm message to the originating node (e.g., serving radio network controller (SRNC) $26_1$). Thus, the establish confirmation signaling is properly coordinated or sequenced, so that the establish confirmation signaling is sent beginning in closest order of proximity of the corresponding connection segment to the terminating node. In this regard, the establish confirm message of action 6-18 (for connection segment $400_1$) was sent prior to sending of the establish confirm message of action 6-23 (for connection segment $400_3$).

As evident from the above description, the call layer handles three connection segments instead of one end-to-end connection. In the illustrated embodiment this is accomplished using three different application programmable interfaces (APIs), specifically application programmable interface $API_1$, application programmable interface $API_2$, and application programmable interface $API_3$. As shown in FIG. 6, the application programmable interface $API_1$ exists in the serving radio network controller (RNC) $26_1$; the application programmable interface $API_2$ exists in the drift radio network controller (DRNC) $26_2$; and the application programmable interface $API_3$ exists in the base station $28_{2-1}$. These application programmable interfaces are utilized in the manners described above. For example, the application programmable interface $API_2$ which is introduced into drift radio network controller (DRNC) $26_2$ informs the call layer (e.g., call layer control process $52_2$) that the connection is routed to a connection point on an ET at drift radio network controller (DRNC) $26_2$. The call layer obtains the VP/VC and CID on the incoming ET which is used to setup the second segment. The call layer may also have to inform the connection layer (E.g., connection layer control process $42_2$) over the application programmable interface $API_2$ to send an establish confirm message (e.g., the message of action 6-23) from drift radio network controller (DRNC) $26_2$ to serving radio network controller (RNC) $26_1$ when an establish confirm message (e.g., the message of action 6-18) has been received over from base station $28_{2-1}$, thereby reflecting the fact that a full path from device to device has been through connected.

An example of using binding information for the two connection segment mode of the present invention (illustrated in FIG. 5A–FIG. 5D) is described with reference to certain example basic actions in FIG. 7. In the second connection segment mode the call layer uses the already-reserved connection point $636_2$ on the incoming extension terminal $25_2$ as the origination point for the first connection segment $500_1$. The call layer in the second connection segment mode orders that a connection segment be set up from the incoming extension terminal $25_2$ to the destination point $636_3$. The connection layer thus routes the first connection segment $500_1$ over an outgoing extension terminal $25_{2-1}$ to the base station $28_{2-1}$ (and reserves a connection/multiplexing point on the extension terminal $25_{2-1}$), and through connects switch $120_2$ of drift radio network controller (DRNC) $26_2$ so that the base station $28_{2-1}$ can be signaled using Q.AAL2. Thus, instead of handling three segments or fragments, in the second connection segment mode only two segments are utilized. Moveable connection points must be supported by the connection layer in this second connection segment mode.

For the two connection segment mode, the connection segment $500_2$ (see FIG. 5A) is set up using binding information in the same manner as the third connection segment $400_3$ of the three connection segment mode. For this reason, actions 7-1 through 7-8 of FIG. 7 are essentially identical to actions 6-1 through 6-8 of FIG. 6. Set up of the first connection leg $500_1$ of the second connection segment mode, however, differs from procedures described in the three connection segment mode, as discussed below.

Concerning in more detail the first connection leg $500_1$ of the second connection segment mode, as action 7-10 at base station $28_{2-1}$ the call layer (more specifically call layer control process $52_3$) reserves a connection endpoint (e.g., connection endpoint $636_3$). The connection endpoint is described by connection endpoint information which, as mentioned above, can be vendor specific information (e.g., a concatenation of node, cabinet rack, slot, port, and resource). As action 7-11, the call layer (more specifically call layer control process $52_3$ at base station $28_{2-1}$) obtains a binding reference to represent a connection endpoint $636_3$. As previously discussed, the binding reference of action 7-11 can be obtained from the connection layer, or alternatively obtained from the call layer. FIG. 7 particularly shows as action 7-11 obtaining the binding reference from a table $70_3$ maintained by the connection layer control process $42_3$.

As action 7-12, the call layer control process $52_2$ of base station $28_{2-1}$ transmits a call layer signaling message to drift radio network controller (DRNC) $26_2$. The call layer signaling message of action 7-12 can include the binding information (BI) obtained as action 7-11 and an ATM end system address (AESA) of base station $28_{2-1}$. The call layer signaling message of action 7-12 can be in the form of an appropriate existing protocol, such as RANAP, RNSAP, and NBAP when the telecommunications network is a radio access network known as UTRAN.

The call layer control process $52_2$ of drift radio network controller (DRNC) $26_2$ need not reserve a connection point for connection segment $500_1$, since already-reserved connection point $636_2$ will be utilized for one endpoint of connection segment $500_1$. The call layer control process $52_2$ can then proceed to action 7-14, which is the sending of a connection request signaling message to the connection layer control process $42_2$. The connection request signaling message sent to the connection layer as action 7-14 includes the AESA of base station $28_{2-1}$, the binding information, and the already-reserved connection point (e.g., connection point $636_2$).

As action 7-15A, the connection layer control process $42_2$ reserves an outgoing multiplexing connection on extension terminal $25_{2-1}$ and through connects switch $120_2$ (so that the outgoing multiplexing connection on extension terminal $25_{2-1}$ is connected to connection point $636_2$ on extension terminal $25_2$). Subsequently, as action 7-15B, the connection layer control process $42_2$ sends connection layer signaling through the connection layer from drift radio network controller (DRNC) $26_2$ to base station $28_{2-1}$. The connection layer signaling of action 7-15B includes the binding information and the AESA of base station $28_{2-1}$. In like manner as above mentioned, the connection layer signaling message of action 7-15B can be in any of several protocols, including Q.AAL2, B-ISUP, and PNNI.

Upon receipt of the connection layer signaling of action 7-15B, the connection layer control process $42_3$ in the connection layer base station $28_{2-1}$ accesses the binding information included therein. Using the binding information obtained from the connection layer signaling, as action 7-16 the connection layer control process $42_3$ accesses table $70_3$ to obtain the appropriate connection endpoint information, i.e., the connection endpoint information for connection endpoint $636_3$. Then, as action 7-17 the call layer control process $52_3$ at base station $28_{2-1}$, using the vendor-specific connection endpoint information acquired from table $70_3$, issues signals to through connect switch $120_3$, so that the connection endpoint $636_3$ associated with the connection endpoint information is through connected to device $624_3$, thereby setting up the first connection segment $500_1$ for the second connection segment mode.

Figure 7:
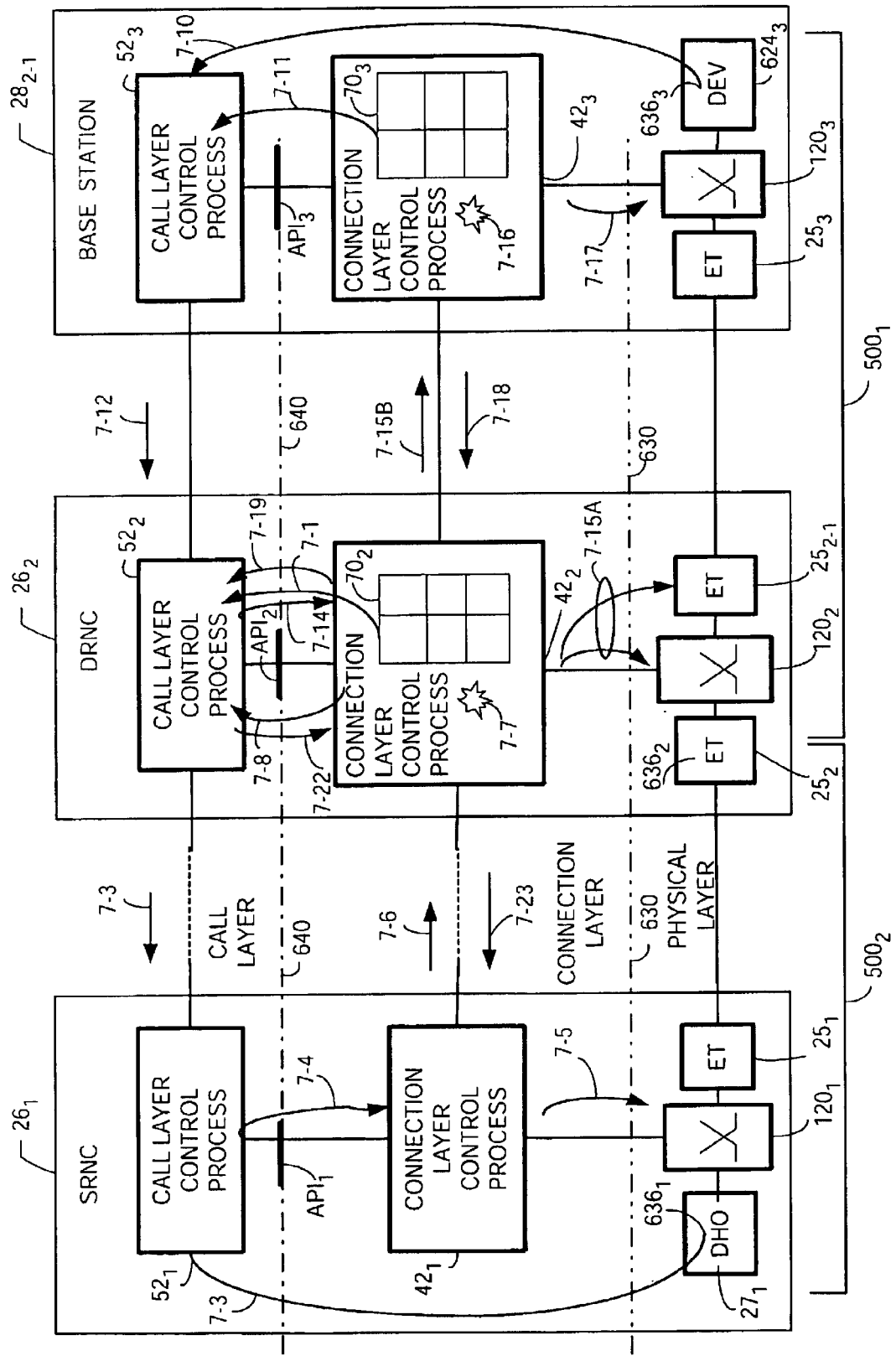
FIG. 7 is a diagrammatic view showing stages of a call layer and connection layer binding technique for the second example mode of the invention.

Action 7-18 of FIG. 7 shows that, upon through connection of switch $120_3$ as above described relative to action 7-17, the connection layer control process $42_3$ at the terminating node (e.g., base station $28_{2-1}$) sends an establish confirm signaling message to drift radio network controller (DRNC) $26_2$. Upon receipt of the establish confirm message of action 7-18, as action 7-19 the connection layer control process $42_2$ at drift radio network controller (DRNC) $26_2$ sends a confirm notification indication to call layer control process $52_2$ at drift radio network controller (DRNC) $26_2$. Then, as action 7-22, call layer control process $52_2$ of drift radio network controller (DRNC) $26_2$ requests over application programmable interface $API_2$ that connection layer control process $42_2$ send an establish confirm message from drift radio network controller (DRNC) $26_2$ to serving radio network controller (RNC) $26_1$. FIG. 6 shows that, as action 7-23, the connection layer control process $42_2$ sends an establish confirm message to the originating node (e.g., serving radio network controller (SRNC) $26_1$).

The indication 7-19 from connection layer control process $42_2$ to call layer control process $52_2$, and the direction of action 7-22 from call layer control process $52_2$ to connection layer control process $42_2$ exist in view of the fact that connection segments $500_1$ and $500_2$ are treated as separate connections which need to know of each other and the call layer must coordinate that the different connection segments belong to the same call.

Thus, as in the three connection segment mode, in the two connection segment mode the establish confirmation signaling is again properly coordinated or sequenced, so that the establish confirmation signaling is sent beginning in closest order of proximity of the corresponding connection segment to the terminating node. In this regard, the establish confirm message of action 7-18 (for connection segment $500_1$) was sent prior to sending of the establish confirm message of action 7-23 (for connection segment $500_2$).

The illustrated embodiments representatively depict a single connection layer process in the connection layer for each node. It should be understood, however, that it may be preferable to have in each node a separate connection layer process for each connection segment.

Figure 8:
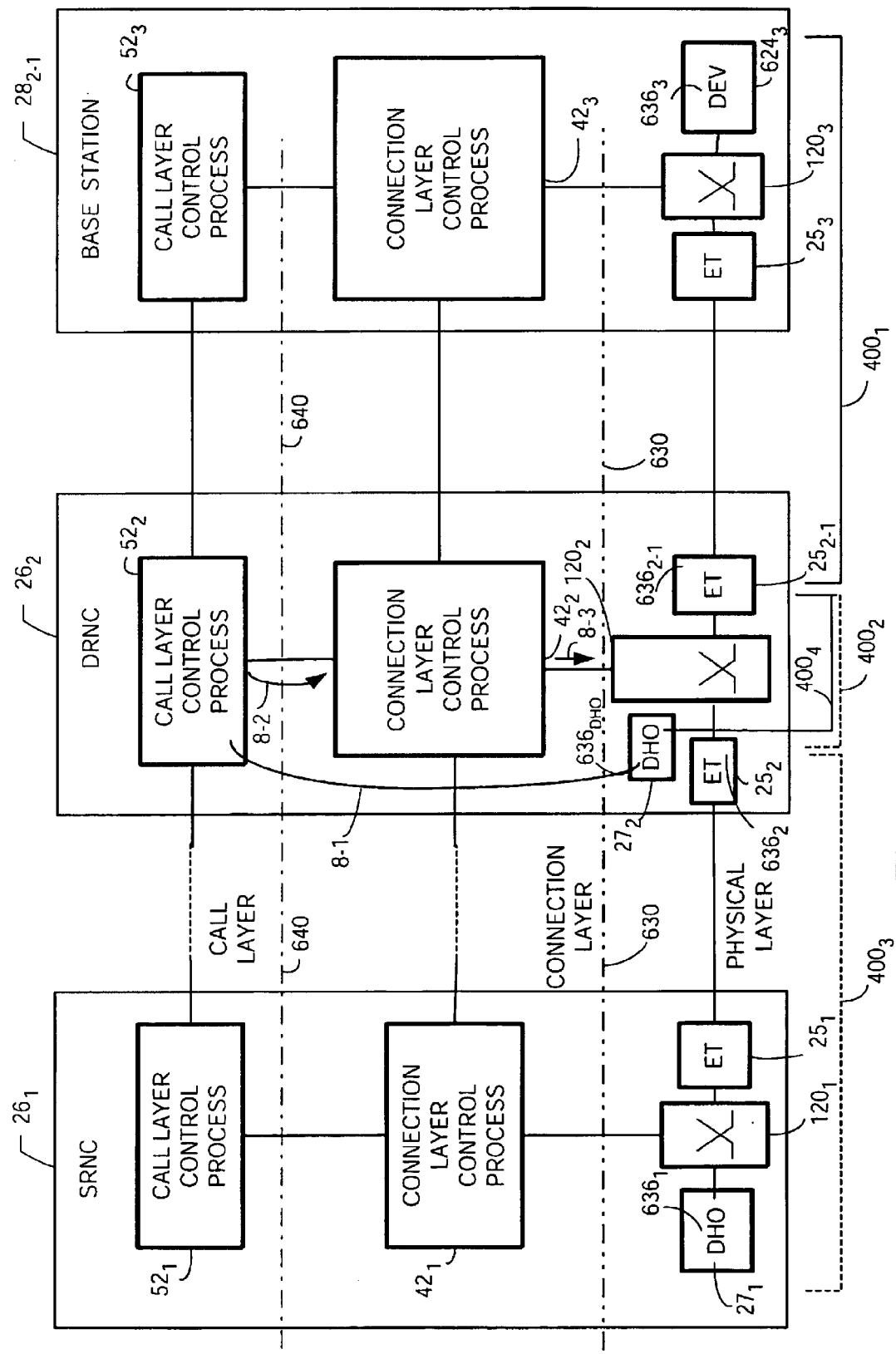
FIG. 8 is a diagrammatic view showing a call layer and connection layer binding technique for the first mode of the invention during an SRNC relocation procedure.

FIG. 8 is a diagrammatic view showing basic example actions involved a call layer and connection layer binding technique for the three connection segment mode of the invention during an SRNC relocation procedure. FIG. 8 thus shows the nodes involved in the three connection segment mode at a time subsequent to FIG. 6. As action 8-1, the call layer control process $52_2$ reserves a connection point $636_{DHO}$ in diversity handling (DHO) unit $27_2$. Then, as action 8-2, the call layer control process $52_2$ sends a connection request message to connection layer control process $42_2$. The connection request message of action 8-2 requests that the connection/multiplexing point represented by connection point $636_{2-1}$ on outgoing extension terminal $25_{2-1}$ be connected through switch $120_2$ with the connection point $636_{DHO}$ of diversity handling (DHO) unit $27_2$. Action 8-3 shows the connection layer control process $42_2$ of drift radio network controller (DRNC) $26_2$ issuing the command(s) to the physical layer to through connect switch $120_2$ to accommodate the connection request message of action 8-2, thereby forming the connection segment $400_4$ (see FIG. 4B).

For sake of simplicity, FIG. 8 does not show the tearing down of the connection segments $400_2$ and $400_3$. Removal of the connection segments $400_2$ and $400_3$ is part of the SRNC relocation procedure, and understood by the person skilled in the art, e.g., in view of the foregoing.

Figure 9:
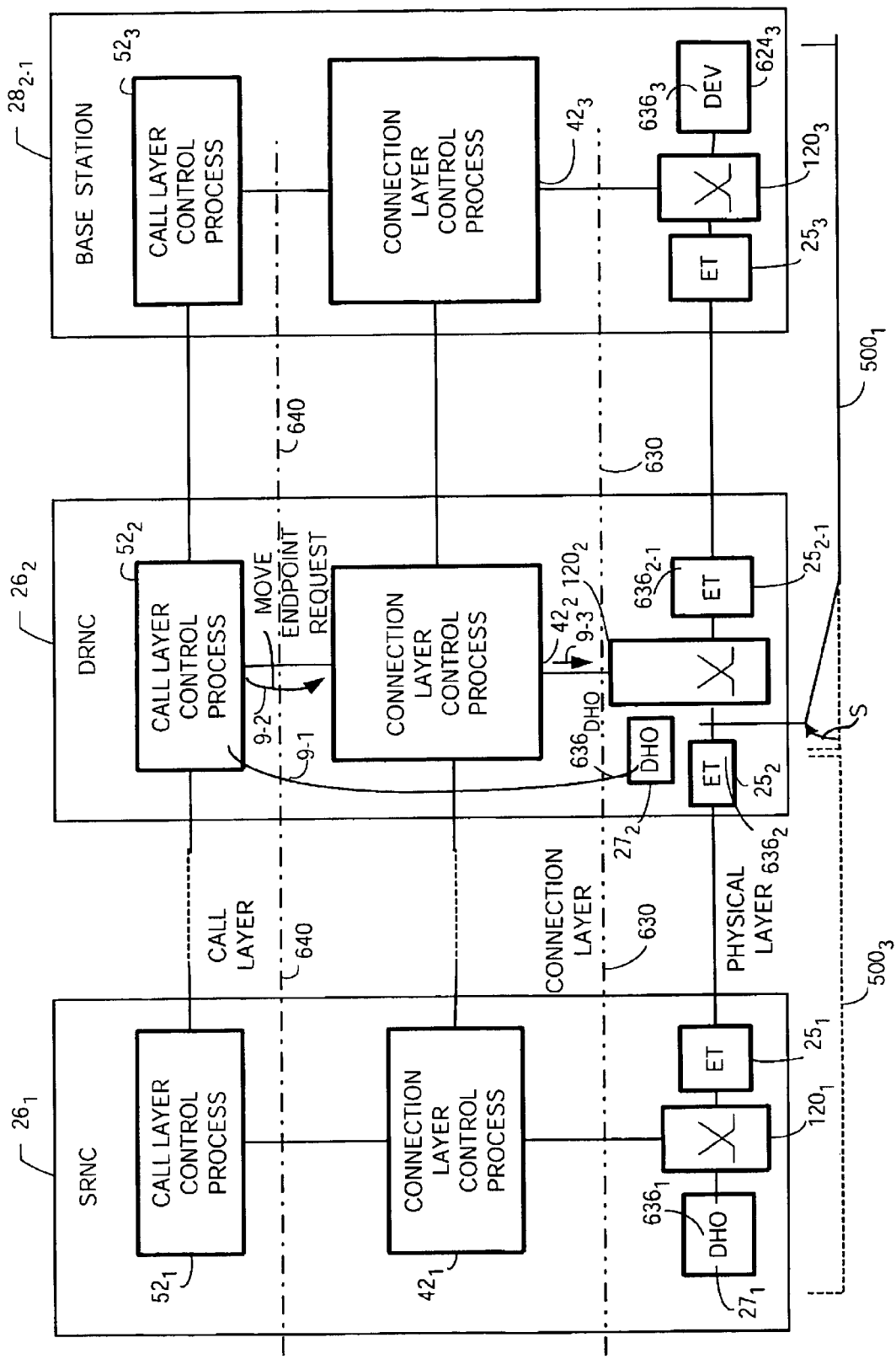
FIG. 9 is a diagrammatic view showing a call layer and connection layer binding technique for the second mode of the invention during an SRNC relocation procedure.

FIG. 9 is a diagrammatic view showing basic example actions involved a call layer and connection layer binding technique for the two connection segment mode of the invention (see FIG. 5A–FIG. 5D) during an SRNC relocation procedure. FIG. 9 thus shows the nodes involved in the two connection segment mode at a time subsequent to FIG. 7. As action 9-1, the call layer control process $52_2$ reserves a connection point $636_{DHO}$ in diversity handling (DHO) unit $27_2$. Then, as action 9-2, the call layer control process $52_2$ sends a move point request message to connection layer control process $42_2$. The move point request message of action 9-2 requests that second endpoint of connection segment $500_1$ be moved from the connection/multiplexing point represented by connection point $636_2$ on incoming extension terminal $25_2$ to the connection point $636_{DHO}$ of diversity handling (DHO) unit $27_2$. Action 9-3 shows the connection layer control process $42_2$ of drift radio network controller (DRNC) $26_2$ issuing the command(s) to the physical layer to through connect switch $120_2$ to accommodate the connection request message of action 9-2, thereby moving the second endpoint of the connection segment $500_1$ in the manner depicted by arrow S (see FIG. 5C and FIG. 9).

Again for sake of simplicity, FIG. 9 does not show the tearing down of the connection segment $500_2$. Removal of the connection segment $500_2$ is part of the SRNC relocation procedure, and understood by the person skilled in the art, e.g., in view of the foregoing.

Thus, the present invention utilizes binding information to accommodate employment of the multiple connection segments such as described in the three connection segment mode of FIG. 4A–FIG. 4C and the two connection segment mode of FIG. 5A–FIG. 5D. What has been described above with reference to binding reference information serves as exemplary ways of implementing aspects of the present invention. Other binding information techniques are also within the scope of the present invention, including those described in simultaneously-filed U.S. patent application Ser. No. 09/829,451, (attorney docket: 2380-187), entitled "Binding Information For Telecommunications Network", which is incorporated herein by reference in its entirety.

The present invention advantageously causes no disturbance to the connection segment involving the base station (such as base station $28_{2-1}$ in the above described scenarios) upon performance of the SRNC relocation procedure, and minimizes or avoids any impact on call layer signaling. Moreover, the present invention allows an application in the drift RNC (DRNC) to allocate a diversity handling unit (DHO) resource at a time the SRNC relocation procedure is performed, and tear down the connection segment over the Iur interface and a node internal connection (in the three connection segment mode), but keeping the connection segment between the drift RNC (DRNC) and the base station (e.g., base station $28_{2-1}$).

While AAL2 signaling is normally utilized in the prior art to set up AAL2 connections end-to-end between devices, the present invention utilizes AAL2 signaling to setup connection or link segments (e.g., fragments) to connection/multiplexing points also.

Various aspects of ATM-based telecommunications are explained in the following: U.S. patent applications Ser. No. 09/188,101 [PCT/SE98/02325] and Ser. No. 09/188,265

[PCT/SE98/02326] entitled "Asynchronous Transfer Mode Switch"; U.S. patent application Ser. No. 09/188,102 [PCT/SE98/02249] entitled "Asynchronous Transfer Mode System", all of which are incorporated herein by reference. The present invention is not limited to ATM switch-based telecommunication nodes, but can be implemented with other types of protocols as well.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use in a radio access network of a telecommunications system, the radio access network including a first radio network control node and a second radio network control node, a method comprising:

using an end-to-end signaling protocol for:
   (1) establishing, as one of the plural distinct connection segments comprising a radio connection involving a user equipment unit, a connection segment between a first device at the second radio network control node and a base station controlled by the second radio network control node;
   (2) establishing, as another of the plural distinct connection segments, a connection segment between the first device at the second radio network control node and a second device at the second radio network control node;

using the first radio network control node as a serving radio network control (SRNC) node and using the second radio network control as drift radio network control (DRNC) node for the radio connection with the user equipment unit.

2. The method of claim 1, further comprising using AAL2 signaling as the end-to-end signaling protocol.

3. The method of claim 1, wherein an establish confirm message of the end-to-end protocol is not received at the first radio network control node until a user plane has been set up for all of the plural connection segments.

4. The method of claim 1, further comprising:
   performing a SRNC relocation procedure to make the second radio network control node serve as the SRNC for the radio connection involving the user equipment unit; and thereafter still
   using a retained one of the at least one of the plural distinct connection segments between the base station controlled by the second radio network control node and the device at the second radio network control node to comprise the radio connection with the user equipment unit.

5. The method of claim 4, further comprising using the retained one of the plural distinct connection segments in series with a post-relocation connection segment to establish a path between the base station controlled by the second radio network control node and a diversity handover unit at the second radio network control node.

6. The method of claim 4, further comprising moving an endpoint of the retained one of the plural distinct connection segments to a diversity handover unit at the second radio network control node.

7. The method of claim 1, further comprising:
   (3) establishing, as yet another of the plural distinct connection segments, a connection segment between the second device at the second radio network control node and the device at the first radio network control node.

8. The method of claim 1, wherein the first device is a first connection point and the second device is a second connection point.

9. The method of claim 8, wherein the first device is a first extension terminal and the second device is a second extension terminal, and wherein the connection segment of step (1) extends through a switch at the second radio network control node.

10. The method of claim 1, further comprising:
    performing a SRNC relocation procedure to make the second radio network control node serve as the SRNC for the radio connection involving the user equipment unit; and thereafter
    retaining the connection segment established by step (1) to comprise the radio connection with the user equipment unit.

11. The method of claim 10, further comprising, subsequent to performance of the SRNC relocation procedure, using the connection segment established by step (1) in series with a post-relocation connection segment to establish a path between the base station controlled by the second radio network control node and a diversity handover unit at the second radio network control node.

12. The method of claim 1, further comprising:
    (A) establishing, as a retainable one of the plural distinct connection segments, a connection segment between the first device at the second radio network control node and the base station controlled by the second radio network control node.

13. The method of claim 12, further comprising:
    (B) establishing, as another of the plural distinct connection segments, a connection segment between the first device at the second radio network control node and the device at the first radio network control node.

14. The method of claim 12, wherein the first device at the second radio network control node is a connection point situated between a switch of the second radio network control node and a link to the first radio network control node.

15. The method of claim 12, wherein the first device at the second radio network control node is an extension terminal.

16. The method of claim 12, further comprising:
    performing a SRNC relocation procedure to make the second radio network control node serve as the SRNC for the radio connection involving the user equipment unit; and thereafter
    using the retainable one of the connection segments established by step (A) to comprise the radio connection with the user equipment unit.

17. The method of claim 16, further comprising, as part of the SRNC relocation procedure, moving an endpoint of the retainable one of the plural distinct connection segments to a diversity handover unit at the second radio network control node.

18. For use in a radio access network of a telecommunications system, the radio access network including a first radio network control node and a second radio network control node, a method comprising using an end-to-end signaling protocol to establish at least node-transcending ones of plural distinct connection segments comprising a radio connection involving a user equipment unit, the plural distinct connection segments extending in series between a device in the first radio network control node and a base station controlled by the second radio network control node, the first radio network control node serving as a serving radio network control (SRNC) node and the second radio network control serving as a drift radio network control (DRNC) node for the radio connection with the user equipment unit;

wherein the node-transcending one of the plural distinct connection segments has a connection point at a given node, the given node is the first radio network control node, the second radio network control node, or the base station;

wherein the given node has a call control process in a call layer which is separated from a connection control process in a connection layer, and wherein the method further comprises the call layer control process obtaining a binding reference to represent the connection point.

19. The method of claim 18, wherein the binding reference is in a predetermined range which is reserved for setting up AAL2 connections to connection points.

20. The method of claim 19, wherein the binding reference is a Served User Generated Reference (SUGR).

21. The method of claim 18, wherein the binding reference is associated in a table with a predetermined value which denotes a connection point value.

22. The method of claim 18, wherein the binding reference is obtained from the connection layer.

23. The method of claim 18, wherein the binding reference is obtained from the call layer.

24. A radio access network of a telecommunications system comprising:

a first radio network control node which serves as a serving radio network control (SRNC) node for a radio connection with the user equipment unit;

a device situated at the first radio network control node;

a second radio network control node which serves as a drift radio network control (DRNC) node for the radio connection with the user equipment unit;

a base station controlled by the second radio network control node;

wherein the first radio network control node uses an end-to-end signaling protocol to establishes;

(1) as one of the plural distinct connection segments, comprising the radio connections, a connection segment between a first device at the second radio network control node and the base station controlled by the second radio network control node;

(2) as another of the plural distinct connection segments, a connection segment between the first device at the second radio network control node and a second device at the second radio network control node.

25. The apparatus of claim 24, wherein the first radio network control node uses AAL2 signaling as the end-to-end signaling protocol.

26. The apparatus of claim 24, wherein an establish confirm message of the end-to-end protocol is not received at the first radio network control node until a user plane has been set up for all of the plural connection segments.

27. The apparatus of claim 24, wherein the first radio network control node participates in a SRNC relocation procedure to make the second radio network control node serve as the SRNC for the radio connection involving the user equipment unit, and wherein after the SRNC relocation procedure at least one of the plural distinct connection segments between the base station controlled by the second radio network control node and the device at the second radio network control node is retained to comprise the radio connection with the user equipment unit.

28. The apparatus of claim 27, wherein the retained one of the plural distinct connection segments is used in series with a post-relocation connection segment to establish a path between the base station controlled by the second radio network control node and a diversity handover unit at the second radio network control node.

29. The apparatus of claim 28, wherein an endpoint of the retained one of the plural distinct connection segments is moved to a diversity handover unit at the second radio network control node.

30. The apparatus of claim 24, wherein the first radio network control node further establishes:

(3) as yet another of the plural distinct connection segments, a connection segment between the second device at the second radio network control node and the device at the first radio network control node.

31. The apparatus of claim 24, wherein the first device is a first connection point and the second device is a second connection point.

32. The apparatus of claim 31, wherein the first device is a first extension terminal and the second device is a second extension terminal, and wherein the connection segment of (1) extends through a switch at the second radio network control node.

33. The apparatus of claim 31, wherein the first radio network control node and the second radio network control node participate in a SRNC relocation procedure to make the second radio network control node serve as the SRNC for the radio connection involving the user equipment unit, and wherein after performance of the SRNC relocation procedure the connection segment established by (1) is retained to comprise the radio connection with the user equipment unit.

34. The apparatus of claim 33, wherein the connection segment established by (1) is utilized in series with a post-relocation connection segment to establish a path between the base station controlled by the second radio network control node and a diversity handover unit at the second radio network control node.

35. The apparatus of claim 24, wherein the first radio network control node establishes:

(A) as a retainable one of the plural distinct connection segments, a connection segment between the first device at the second radio network control node and the base station controlled by the second radio network control node.

36. The apparatus of claim 35, wherein the first radio network control node further establishes:

(B) as another of the plural distinct connection segments, a connection segment between the first device at the second radio network control node and the device at the first radio network control node.

37. The apparatus of claim 35, wherein the first device at the second radio network control node is a connection point situated between a switch of the second radio network control node and a link to the first radio network control node.

38. The apparatus of claim 35, wherein the first device at the second radio network control node is an extension terminal.

39. The apparatus of claim 35, wherein the first radio network control node and the second radio network control node participate in a SRNC relocation procedure to make the second radio network control node serve as the SRNC for the radio connection involving the user equipment unit, and wherein after performance of the SRNC relocation procedure the retainable one of the connection segments established by step (A) is used to comprise the radio connection with the user equipment unit.

40. The apparatus of claim 39, wherein, as part of the SRNC relocation procedure, an endpoint of the retainable one of the plural distinct connection segments is moved to a diversity handover unit at the second radio network control node.

41. A radio access network of a telecommunications system comprising:

a first radio network control node;

a device situated at the first radio network control node;

a second radio network control node;

a base station controlled by the second radio network control node;

wherein the first radio network control node uses an end-to-end signaling protocol to establish at least node-transcending ones of plural distinct connection segments comprising a radio connection involving a user equipment unit, the plural distinct connection segments extending in series between the device in the first radio network control node and the base station controlled by the second radio network control node, the first radio network control node serving as a serving radio network control (SRNC) node and the second radio network control serving as a drift radio network control (DRNC) node for the radio connection with the user equipment unit;

wherein each of the first radio network control node, the second radio network control node, and the base station controlled by the second radio network control node each have a call control process in a call layer which is separated from a connection control process in a connection layer, and wherein at least one of the first radio network control node, the second radio network control node, and the base station controlled by the second radio network control node has an application programmable interface between the call layer and the connection layer.

42. The apparatus of claim 41, wherein the second radio network control node has an application programmable interface between the call layer and the connection layer, and wherein the application programmable interface is employed by the call layer to inform the connection layer to send an establish confirm message to the first radio network control node.

43. A radio access network of a telecommunications system comprising:

a first radio network control node;

a device situated at the first radio network control node;

a second radio network control node;

a base station controlled by the second radio network control node;

wherein the first radio network control node uses an end-to-end signaling protocol to establish at least node-transcending ones of plural distinct connection segments comprising a radio connection involving a user equipment unit, the plural distinct connection segments extending in series between the device in the first radio network control node and the base station controlled by the second radio network control node, the first radio network control node serving as a serving radio network control (SRNC) node and the second radio network control serving as a drift radio network control (DRNC) node for the radio connection with the user equipment unit;

wherein the node-transcending one of the plural distinct connection segments has a connection point at a given node, the given node being the first radio network control node, the second radio network control node, or the base station;

wherein the given node has a call control process in a call layer which is separated from a connection control process in a connection layer, and wherein the call layer control process obtains a binding reference to represent the connection point.

44. The method of claim 43, wherein the binding reference is in a predetermined range which is reserved for setting up AAL2 connections to connection points.

45. The method of claim 44, wherein the binding reference is a Served User Generated Reference (SUGR).

46. The method of claim 43, wherein the binding reference is associated in a table with a predetermined value which denotes a connection point value.

47. The method of claim 43, wherein the binding reference is obtained from the connection layer.

48. The method of claim 43, wherein the binding reference is obtained from the call layer.

\* \* \* \* \*